United States Patent
Fuwa

(10) Patent No.: US 6,779,508 B2
(45) Date of Patent: Aug. 24, 2004

(54) CONTROL SYSTEM OF INTERNAL COMBUSTION ENGINE

(75) Inventor: Naohide Fuwa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/636,635

(22) Filed: Aug. 8, 2003

(65) Prior Publication Data

US 2004/0035391 A1 Feb. 26, 2004

(30) Foreign Application Priority Data

Aug. 26, 2002 (JP) ........................................ 2002-245075

(51) Int. Cl.[7] .............................................. F02D 7/00
(52) U.S. Cl. ...................................... 123/396; 123/395
(58) Field of Search ................................ 123/396, 395, 123/397, 398, 319

(56) References Cited

U.S. PATENT DOCUMENTS

| | | | |
|---|---|---|---|
| 5,024,191 A | 6/1991 | Nagahiro et al. | |
| 5,950,597 A | 9/1999 | Kamio et al. | |
| 6,039,026 A | 3/2000 | Shiraishi et al. | |
| 6,318,313 B1 | 11/2001 | Moriya et al. | |
| 6,408,806 B2 * | 6/2002 | Sugiyama et al. | 123/90.15 |
| 6,435,149 B2 | 8/2002 | Moriya et al. | |

FOREIGN PATENT DOCUMENTS

| | | |
|---|---|---|
| EP | 1 010 865 A1 | 6/2000 |
| EP | 1 128 027 A2 | 8/2001 |
| JP | A 11-270369 | 10/1999 |
| JP | A 2000-73799 | 3/2000 |
| JP | A 2001-200737 | 7/2001 |

* cited by examiner

*Primary Examiner*—Bibhu Mohanty
(74) *Attorney, Agent, or Firm*—Oliff & Berridge, PLC

(57) ABSTRACT

A control system of an internal combustion engine includes a timing changing unit that changes opening and closing timing of an intake valve relative to rotation of an output shaft of the engine, a working angle changing unit that changes a working angle of the intake valve, a throttle mechanism including a throttle valve provided in an intake passage of the engine and an actuator that is operable to open and close the throttle valve, and an intake air quantity control unit that controls the timing changing unit, the working angle changing unit and the throttle mechanism so as to control an intake air quantity of the engine to a target intake air quantity. The control system detects a failure of at least one of the timing changing unit, the working angle changing unit and the throttle mechanism, and, upon detection of a failure, executes a selected one of difference fail-safe control processes corresponding to different forms of failures, depending upon the form of the detected failure.

25 Claims, 18 Drawing Sheets

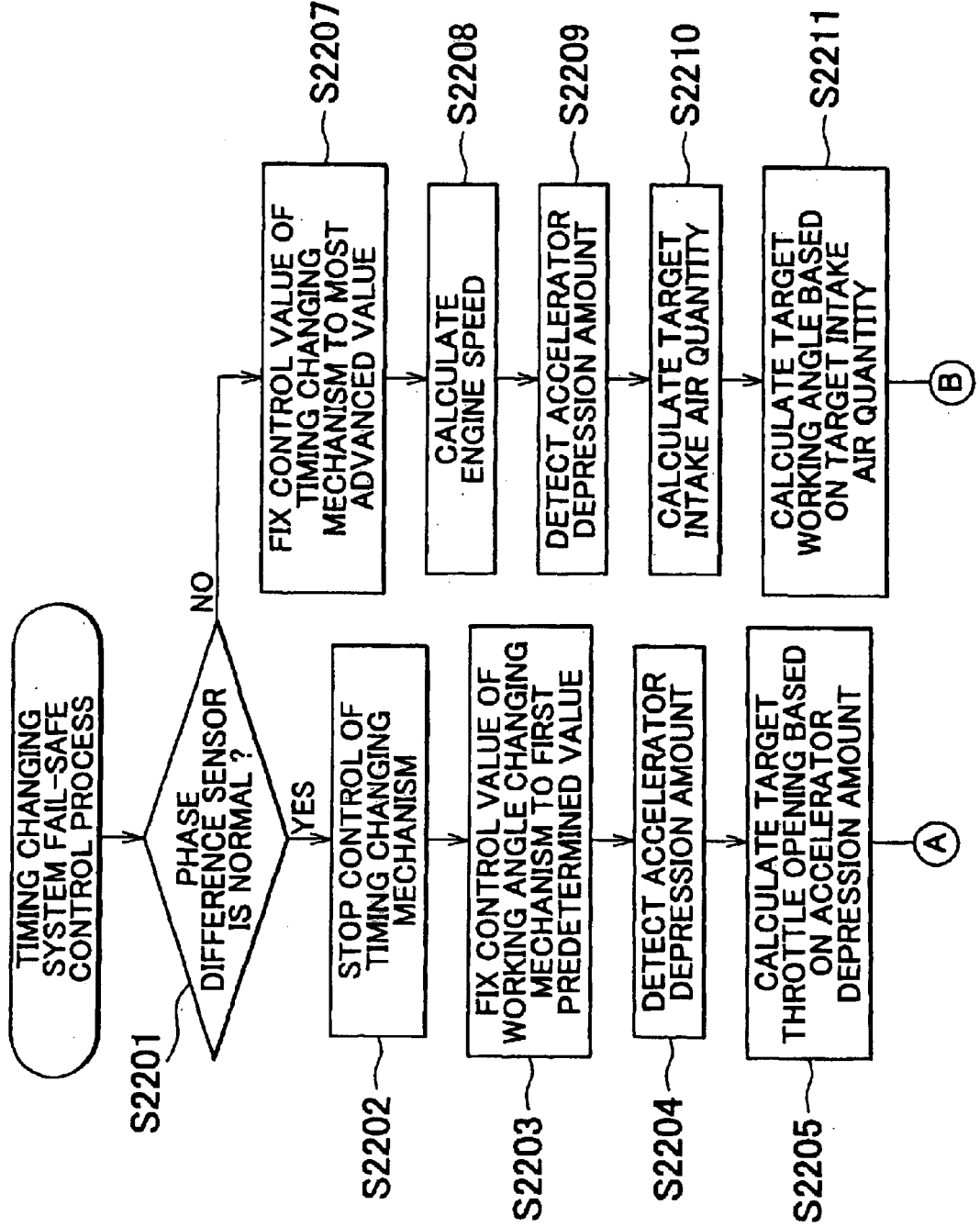

F I G. 22B
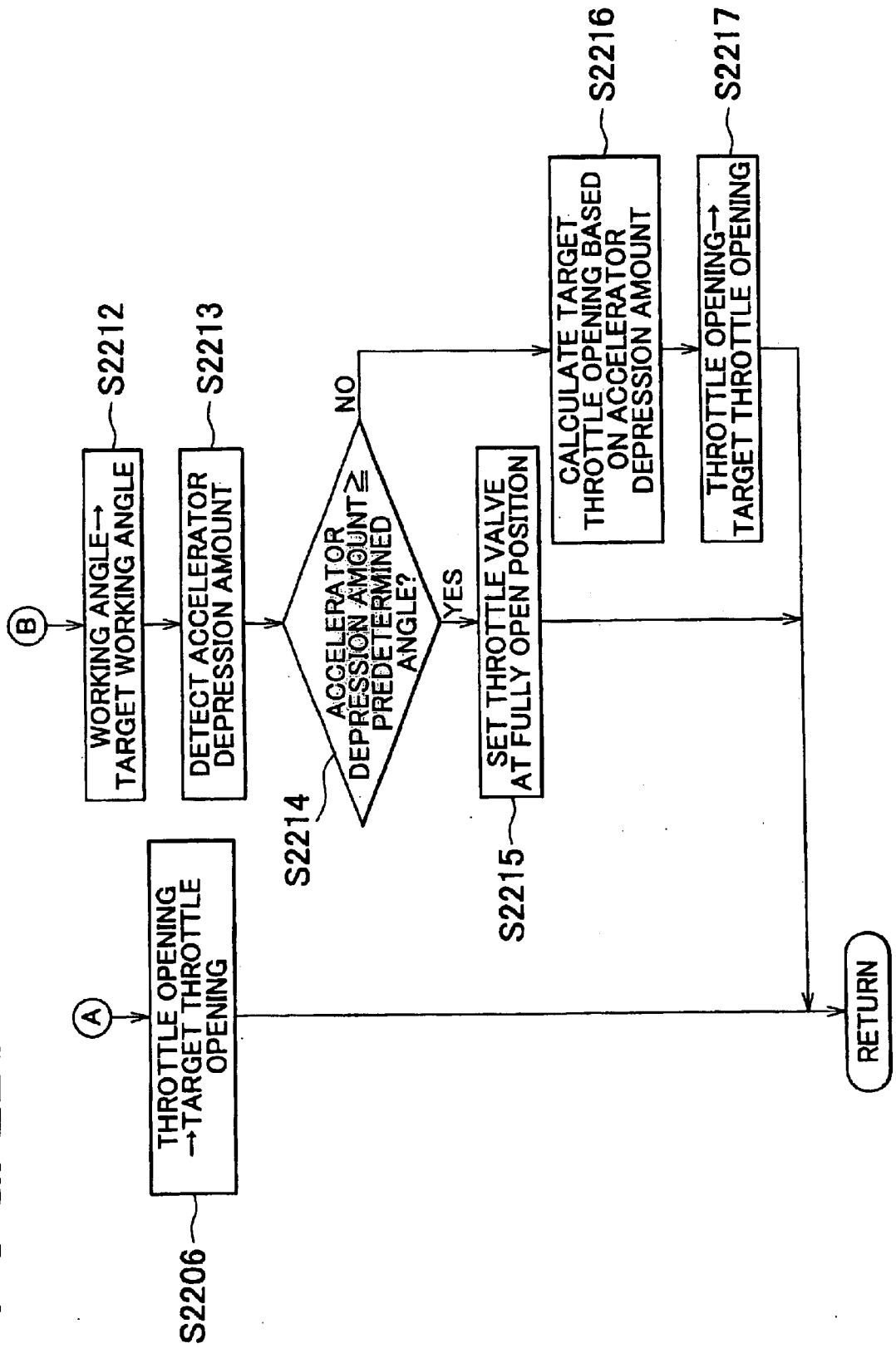

CONTROL SYSTEM OF INTERNAL COMBUSTION ENGINE

INCORPORATION BY REFERENCE

The disclosure of Japanese Patent Application No. 2002-245075 filed on Aug. 26, 2002, including the specification, drawings and abstract, is incorporated herein by reference in its entirety.

BACKGROUND OF THE INVENTION

1. Field of the Invention

The invention relates to a control system of an internal combustion engine installed in an automobile, or the like, and more particularly to a fail-safe control technology for controlling the intake air quantity of the engine by using a variable valve mechanism and a throttle mechanism.

2. Description of Related Art

In recent years, one type of internal combustion engines installed in automobiles, or the like, has been developed which is provided with an electronically controlled throttle mechanism and a variable valve mechanism. In this type of engine, the electronically controlled throttle mechanism is arranged to drive (i.e., open and close) a throttle valve by means of an actuator, and the variable valve mechanism is capable of changing at least one of the opening/closing timing, a working angle and a lift amount of each of intake valves and/or exhaust valves.

A known example of the above type of the internal combustion engine, as disclosed in, for example, U.S. Pat. No. 6,039,026, includes a throttle mechanism capable of driving (i.e., opening and closing) the throttle valve independently of the amount of depression of the accelerator pedal, and a variable valve mechanism capable of changing the opening/closing timing and/or lift amount of intake valves. When the engine operates at a low or middle load, the opening angle of the throttle valve is set to a large degree, and the intake air quantity is adjusted by controlling the closing timing and/or lift amount of the intake valves.

In the known engine as described above, if a failure occurs in the variable valve mechanism, it becomes difficult to control the intake air quantity of the engine to a target intake air quantity, resulting in deterioration in the driveability and the quality of exhaust emissions, which may make it difficult for the vehicle in which the engine is installed to continue running.

SUMMARY OF THE INVENTION

It is therefore an object of the invention to provide a control system of an internal combustion engine in which the intake air quantity is adjusted by using an electronically controlled throttle mechanism and a variable valve mechanism, which system enables a vehicle in which the engine is installed to run at least in a limp-home mode when a failure occurs in, for example, the variable valve mechanism.

To accomplish the above and/or other objects(s), there is provided according to the invention a control system of an internal combustion engine, comprising (a) a timing changing unit that changes opening and closing timing of an intake valve relative to rotation of an output shaft of the engine, (b) a working angle changing unit that changes a working angle of the intake valve, (c) a throttle mechanism including a throttle valve provided in an intake passage of the engine and an actuator that is operable to open and close the throttle valve, (d) an intake air quantity control unit that controls the timing changing unit, the working angle changing unit and the throttle mechanism so as to control an intake air quantity of the engine to a target intake air quantity, (e) a failure detecting unit that detects a failure of at least one of the timing changing unit, the working angle changing unit and the throttle mechanism, and (f) a fail-safe control unit capable of executing different fail-safe control processes corresponding to different forms of failures that can be detected by the failure detecting unit. When the failure detecting unit actually detects a failure, the fail-safe control unit executes a selected one of the different fail-safe control processes depending upon the form of the failure detected by the failure detecting unit.

The control system according to the invention is employed in the internal combustion engine that controls the intake air quantity by utilizing the timing changing unit capable of changing the opening and closing timing of the intake valve relative to rotation of the output shaft of the engine (which will be called "engine output shaft"), the working angle changing unit capable of changing the working angle of the intake valve, and the throttle mechanism including the throttle valve and the actuator for driving (i.e., opening and closing) the throttle valve. The control system of the invention is characterized by executing a fail-safe control process selected from different fail-safe control processes corresponding to different forms of failures, when a failure or failures occur(s) in at least one of the timing changing unit, the working angle changing unit and the throttle mechanism in the internal combustion engine.

In the internal combustion engine that controls the intake air quantity by utilizing the timing changing unit, the working angle changing unit and the throttle mechanism, if a failure or failures occur(s) in one or both of the timing changing unit and the working angle changing unit, it becomes difficult for the intake air quantity control unit to control the actual intake air quantity of the engine to the target intake air quantity. In this case, an error between the actual intake air quantity and the target intake air quantity becomes excessively large, which may make it difficult for the engine to continue operating.

In view of the above situation, when a failure or failures occur(s) in one or both of the timing changing unit and the working angle changing unit, the control system of the engine according to the invention causes the fail-safe control unit to execute a fail-safe control process selected depending upon the form of the failure(s). In this case, an otherwise possible increase in the error between the actual intake air quantity and the target intake air quantity is suppressed, and therefore the engine can easily continue operating.

Examples of the different forms of failures may include (1) the case where a failure occurs in the working angle changing unit, (2) the case where a failure occurs in the timing changing unit, and (3) the case where failures occur in the working angle changing unit and the timing changing unit.

In one embodiment of the control system of the invention, when the failure detecting unit detects a failure of the working angle changing unit, the fail-safe control unit controls the working angle changing unit so that the working angle of the intake valve becomes substantially equal to a predetermined angle, and controls the timing changing unit so that the opening and closing timing of the intake valve substantially coincides with opening and closing timing corresponding to the predetermined angle, while controlling the throttle mechanism so as to change an opening angle of the throttle valve according to the target intake air quantity. In this case, the opening and closing timing of the intake valve is controlled to the timing corresponding to the working angle (i.e., the predetermined angle) of the intake valve, and the opening angle of the throttle valve is controlled to a degree determined according to the target intake air quantity. With this arrangement, the error between the actual intake air quantity and the target intake air quantity is less likely or unlikely to increase, which makes it easy to continue the operation of the engine.

Here, the failure of the working angle changing unit may be in the form of a failure of a drive unit (hereinafter referred to as "working angle changing drive unit") for changing the working angle of the intake valve, or in the form of a failure of a sensor (hereinafter referred to as "working angle sensing unit") for detecting or sensing the working angle of the intake valve.

When the failure detecting unit detects a failure of the working angle changing drive unit, it becomes impossible to change the operating angle of the intake valve. In this case, therefore, the fail-safe control unit may stop control of the working angle changing drive unit, and may control the timing changing unit based on the working angle detected by the working angle sensing unit, while controlling the throttle mechanism so as to change the opening angle of the throttle valve according to the target intake air quantity.

With the above arrangement, the opening and closing timing of the intake valve is controlled to the timing corresponding to the actual working angle, and the opening angle of the throttle valve is controlled to a degree determined according to the target intake air quantity. Consequently, the error between the actual intake air quantity and the target intake air quantity is less likely or unlikely to increase, which makes it easy to continue the operation of the engine.

When the failure detecting unit detects a failure of the working angle sensing unit, on the other hand, it becomes difficult to accurately control the working angle of the intake valve. In this case, therefore, the fail-safe control unit may fix a control value applied to the working angle changing drive unit to a predetermined value, and may control the timing changing unit so as to fix the opening and closing timing of the intake valve to predetermined timing, while controlling the throttle mechanism so as to change the opening angle of the throttle valve according to the target intake air quantity.

With the above arrangement, the working angle of the intake valve and the opening and closing timing of the intake valve are fixed to a predetermined angle and the predetermined opening and closing timing, respectively, and therefore the intake air quantity of the engine can be suitably adjusted by changing the throttle opening. Consequently, the error between the actual intake air quantity and the target intake air quantity is less likely or unlikely to increase, which makes it easy to continue the operation of the engine.

In the above-described control process, the opening and closing timing of the intake valve to be established when the engine is in an idling state is preferably retarded with respect to the opening and closing timing of the intake valve to be established when the engine is in a non-idling state. This is because, if the opening timing of the intake valve is excessively advanced while the engine is in an idling state, the volumetric efficiency of the intake air may be reduced due to reverse flow of exhaust gas.

In the control system of the engine according to the invention, when the failure detecting unit detects a failure of the timing changing unit, the fail-safe control unit may control the timing changing unit so that the opening and closing timing of the intake valve substantially coincides with predetermined opening and closing timing, and may control the working angle changing unit and the throttle mechanism so that the intake air quantity of the engine becomes substantially equal to the target intake air quantity.

In this case, since the opening and closing timing of the intake valve is fixed to the predetermined timing, the intake air quantity of the engine can be adjusted by changing the working angle of the intake valve and the opening angle of the throttle valve. Consequently, the error between the actual intake air quantity and the target intake air quantity is less likely or unlikely to increase, which makes it easy to continue the operation of the engine.

Here, the failure of the timing changing unit may be in the form of a failure of a drive unit (hereinafter referred to as "timing changing drive unit") for changing the opening and closing timing of the intake valve, or in the form of a failure of a sensor (hereinafter referred to as "timing sensing unit") for detecting or sensing the opening and closing timing of the intake valve.

When the failure detecting unit detects a failure of the timing changing drive unit, it becomes impossible to change the opening and closing timing of the intake valve. In this case, therefore, the fail-safe control unit may stop control of the timing changing drive unit, and may control the working angle changing unit so as to fix the working angle of the intake valve to a predetermined angle, while controlling the throttle mechanism so as to change the opening angle of the throttle valve according to the target intake air quantity.

In this case, since the working angle of the intake valve and the opening and closing timing of the intake valve are fixed to the predetermined working angle and predetermined opening and closing timing, respectively, the intake air quantity of the engine can be adjusted by changing the opening angle of the throttle valve. Consequently, the error between the actual intake air quantity and the target intake air quantity is less likely or unlikely to increase, which makes it easy to continue the operation of the engine.

When the failure detecting unit detects a failure of the timing sensing unit, it becomes difficult to accurately control the opening and closing timing of the intake valve relative to rotation of the engine output shaft. In this case, therefore, the fail-safe control unit may fix a control value applied to the timing changing drive unit to a predetermined value, and may control the working angle changing unit so as to change the working angle of the intake valve according to the target intake air quantity.

In this case, since the opening and closing timing of the intake valve is fixed to predetermined opening and closing timing, the intake air quantity of the engine can be adjusted by changing the working angle of the intake valve. Consequently, the error between the actual intake air quantity and the target intake air quantity is less likely or unlikely to increase, which makes it easy to continue the operation of the engine.

In the above-described control process, if the opening and closing timing of the intake valve is retarded relative to rotation of the engine output shaft, the closing timing of the intake valve may be excessively retarded from the bottom dead center of the suction stroke, and the combustion stability of the engine may be reduced. It is therefore preferable to fix the opening and closing timing of the intake valve to such timing that is advanced relative to rotation of the engine output shaft.

In the control system of the engine according to the invention, when the failure detecting unit detects failures of the working angle changing unit and the timing changing unit, the fail-safe control unit may control the working angle changing unit so that the working angle of the intake valve becomes substantially equal to a predetermined angle, and may control the timing changing unit so that the opening and closing timing of the intake valve substantially coincides with predetermined opening and closing timing, while controlling the throttle mechanism so as to change an opening angle of the throttle valve according to the target intake air quantity.

In this case, the working angle of the intake valve and the opening and closing timing of the intake valve are fixed to the predetermined working angle and the predetermined opening and closing timing, respectively, and therefore the intake air quantity of the engine can be adjusted by changing the opening angle of the throttle valve. Consequently, the error between the actual intake air quantity and the target intake air quantity is less likely or unlikely to increase, which makes it easy to continue the operation of the engine.

Examples of different forms of failures occurring in the working angle changing unit and the timing changing unit may include (1) the case where failures occur in the drive unit of the working angle changing unit and the timing sensing unit of the timing changing unit, (2) the case where failures occur in the working angle sensing unit of the working angle changing unit and the drive unit of the timing changing unit, (3) the case where failures occur in the working angle sensing unit of the working angle changing unit and the timing sensing unit of the timing changing unit, and (4) the case where failures occur in the drive unit of the working angle changing unit and the drive unit of the timing changing unit.

When the failure detecting unit detects failures of the working angle changing drive unit and the timing sensing unit, it becomes impossible to change the working angle of the intake valve, and it becomes difficult to accurately control the opening and closing timing of the intake valve. In this case, therefore, the fail-safe control unit may stop control of the working angle changing drive unit, and fixes a control value applied to the timing changing drive unit to a predetermined value, while controlling the throttle mechanism so as to change the opening angle of the throttle valve according to the target intake air quantity.

In this case, since the working angle of the intake valve and the opening and closing timing of the intake valve are fixed to a predetermined working angle and predetermined opening and closing timing, the intake air quantity of the engine can be adjusted by changing the opening angle of the throttle valve. Consequently, the error between the actual intake air quantity and the target intake air quantity is less likely or unlikely to increase, which makes it easy to continue the operation of the engine.

When the failure detecting unit detects failures of the working angle sensing unit and the timing changing drive unit, it becomes difficult to accurately control the working angle of the intake valve, and it becomes impossible to change the opening and closing timing of the intake valve. In this case, therefore, the fail-safe control unit may fix a control value applied to the working angle changing drive unit to a predetermined value, and may stop control of the timing changing drive unit, while controlling the throttle mechanism so as to change the opening angle of the throttle valve according to the target intake air quantity.

In this case, since the working angle of the intake valve and the opening and closing timing of the intake valve are fixed to a predetermined working angle and predetermined opening and closing timing, the intake air quantity of the engine can be adjusted by changing the opening angle of the throttle valve. Consequently, the error between the actual intake air quantity and the target intake air quantity is less likely or unlikely to increase, which makes it easy to control the operation of the engine.

When the failure detecting unit detects failures of the working angle sensing unit and the timing sensing unit, it becomes difficult to accurately control the working angle and opening and closing timing of the intake valve. In this case, therefore, the fail-safe control unit may fix a control value applied to the working angle changing drive unit to a first predetermined value, and fixes a control value applied to the timing changing drive unit to a second predetermined value, while controlling the throttle mechanism so as to change the opening angle of the throttle valve according to the target intake air quantity.

In this case, since the working angle and the opening and closing timing of the intake valve are fixed to a predetermined working angle and predetermined opening and closing timing, the intake air quantity of the engine can be adjusted by changing the opening angle of the throttle valve. Consequently, the error between the actual intake air quantity and the target intake air quantity is less likely or unlikely to increase, which makes it easy to continue the operation of the engine.

When the failure detecting unit detects failures of the working angle changing drive unit and the timing changing drive unit, it becomes impossible to change the working angle and the opening and closing timing of the intake valve. In this case, therefore, the fail-safe control unit may stop control of the working angle changing drive unit and the timing changing drive unit, and may control the throttle mechanism so as to change the opening angle of the throttle valve according to the target intake air quantity.

In this case, since the working angle and the opening and closing timing of the intake valve are fixed to a predetermined working angle and predetermined opening and closing timing, the intake air quantity of the engine can be adjusted by changing the opening angle of the throttle valve. Consequently, the error between the actual intake air quantity and the target intake air quantity is less likely or unlikely to increase, which makes it easy to continue the operation of the engine.

In the internal combustion engine that controls the intake air quantity by utilizing the timing changing unit, the working changing unit and the throttle mechanism, a failure may occur in the throttle mechanism.

The failure of the throttle mechanism may be in the form of a failure of a drive unit (hereinafter referred to as "throttle valve driving unit") for driving (i.e., opening and closing) the throttle valve, or in the form of a failure of a sensing unit (hereinafter referred to as "throttle opening sensing unit") for sensing or detecting the opening angle of the throttle valve.

When the failure detecting unit detects a failure of the throttle valve driving unit or the throttle opening sensing unit, it becomes difficult to accurately change the opening angle of the throttle valve. In this case, therefore, the fail-safe control unit may fix the opening angle of the throttle valve to a predetermined degree by stopping control of the throttle valve driving unit or fixing a control value applied to the throttle valve driving unit to a predetermined value, and may control the working angle changing unit and the timing changing unit according to the target intake air quantity.

In this case, the working angle and opening and closing timing of the intake valve are respectively controlled to those determined according to the target intake air quantity, while the opening angle of the throttle valve is fixed at a certain degree, thus suppressing an otherwise possible increase in the error between the actual intake air quantity and the target intake air quantity.

In the case where the opening angle of throttle valve is fixed at a relatively large degree, however, the actual intake air quantity may become excessively large as compared with the target intake air quantity. In this case, the fail-safe control unit may execute ignition retard control for retarding ignition timing and/or reduced-cylinder operation control for operating the engine with a reduced number of cylinders so as to control the torque of the engine. With this arrangement, the engine is able to continue operating, while at the same time the torque of the engine is prevented from being excessively large as compared with the required torque.

BRIEF DESCRIPTION OF THE DRAWINGS

The foregoing and/or further objects, features and advantages of the invention will become more apparent from the following description of an exemplary embodiment with reference to the accompanying drawings, in which like numerals are used to represent like elements and wherein:

FIG. 22A and FIG. 22B show a flowchart showing a timing changing system fail-safe control routine;

DETAILED DESCRIPTION OF EXEMPLARY EMBODIMENT

Figure 1:
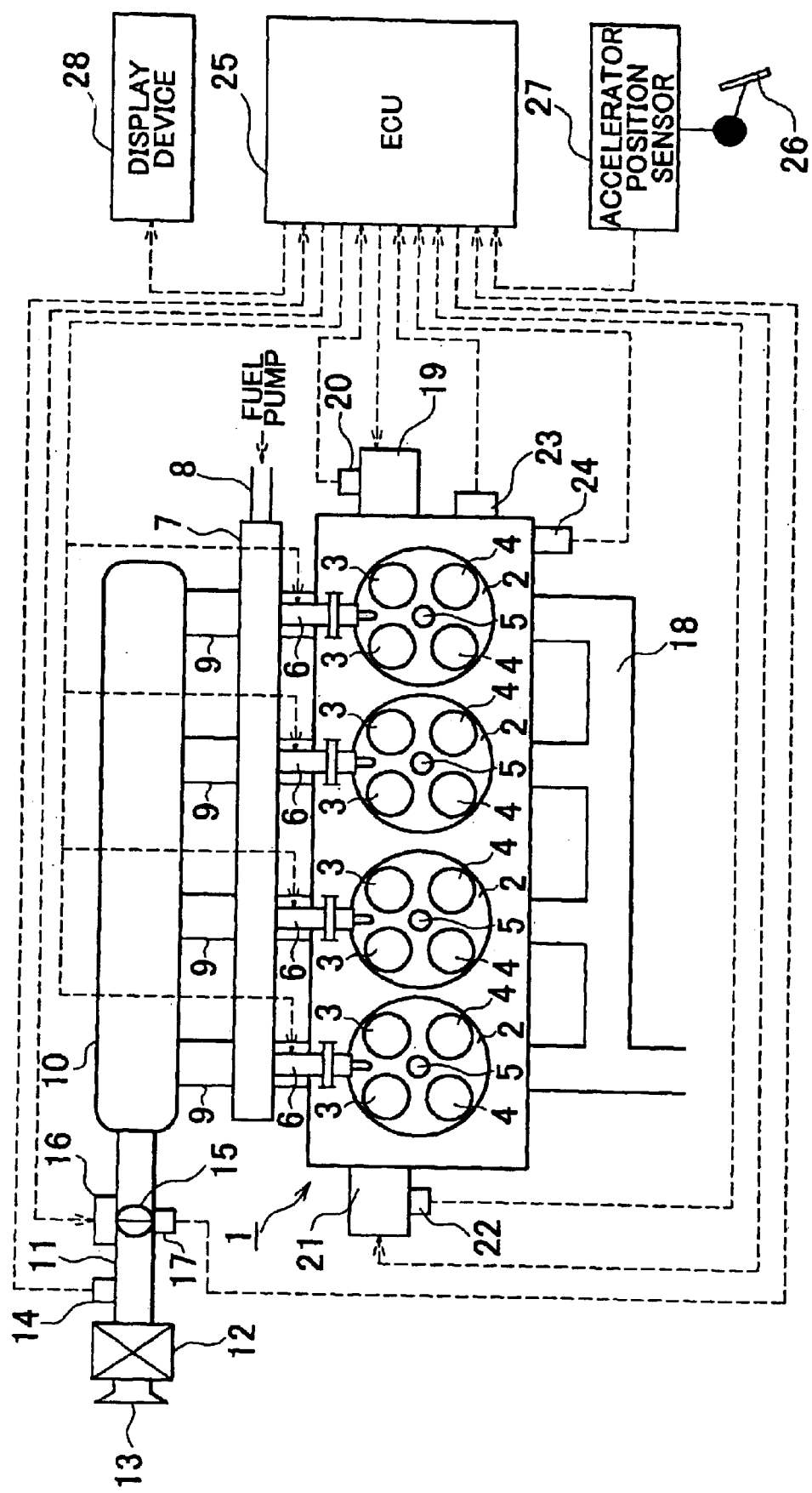
FIG. 1 is a view schematically showing the construction of an internal combustion engine that employs a control system according to one embodiment of the invention.

A control system of an internal combustion engine according to one exemplary embodiment of the invention will be described in detail with reference to the drawings. FIG. 1 schematically shows the construction of an internal combustion engine 1 that employs the control system as one embodiment of the invention. The engine 1 shown in FIG. 1 is a four-stroke, water-cooled gasoline engine using gasoline as a fuel, and is installed in a motor vehicle, such as an automobile.

The internal combustion engine 1 includes four cylinders 2. Each of the cylinders 2 is provided with two intake valves 3 and two exhaust valves 4 such that a spark plug 5 is surrounded by these valves 3, 4. A fuel injector 6 is attached to each of the cylinders 2 such that an injection hole of the fuel injector 6 is exposed to the interior of the cylinder 2. The fuel injectors 6 for the respective cylinders 2 are connected to a delivery pipe 7. The delivery pipe 7 is connected to a fuel pump (not shown) via a fuel pipe 8.

Four intake branch pipes 9 and four exhaust branch pipes 18 are connected to the engine 1. Each of the intake branch pipes 9 communicates with a corresponding one of the cylinders 2 via an intake port (not shown), and is also connected to a surge tank 10. The surge tank 10 is connected to an air cleaner box 12 via an intake pipe 11. An air duct 13 for inducting the outside air into the intake pipe 11 is attached to the air cleaner box 12, and an air filter for removing dust contained in the air drawn through the air duct 13 is housed in the air cleaner box 12.

An air flow meter that generates an electric signal indicative of the mass flow of air passing through the intake pipe 11 is disposed in the intake pipe 11. Also, a throttle valve 15 for adjusting the mass flow of air passing through the intake pipe 11 is disposed in the intake pipe 11 at a location downstream of the air flow meter 14. To the throttle valve 15 is attached a throttle actuator 16 for driving (i.e., opening and closing) the throttle valve 15. The throttle valve 15 is also provided with a throttle position sensor 17 that generates an electric signal indicative of the opening angle of the throttle valve 15.

On the other hand, the above-mentioned four exhaust branch pipes 18 communicate with the respective cylinders 2 via corresponding exhaust ports (not shown). The four branch pipes 18 join together into a single collecting pipe, which leads to an emission control catalyst and a muffler (not shown).

The internal combustion engine 1 is equipped with a timing changing mechanism 19 for changing the opening/closing timing of the intake valves 3, and a working angle changing mechanism 21 for changing the working angle of the intake valves 3. The timing changing mechanism 19 and the working angle changing mechanism 21 may be those well known in the art. In the following description, the operations of the timing changing mechanism 19 and the working angle changing mechanism 21 will be explained with regard to one of the intake valves 3 as a typical intake valve and one of the exhaust valves 4 as a typical exhaust valve.

For example, the timing changing mechanism 19 may be arranged to continuously change the rotational phase of the intake camshaft relative to that of the crankshaft, and the working angle changing mechanism 21 may be arranged to continuously change the working angle and lift of the intake valve 3 by using a rocking cam.

The timing changing mechanism 19 is provided with a phase difference sensor 20 for sensing a difference of the rotational phase of the intake camshaft from that of the crankshaft. The working angle changing mechanism 21 is provided with a working angle sensor 22 for sensing the working angle of the intake valve 3. Here, "working angle" means an angle of rotation of the crankshaft over which the intake valve 3 is open.

An accelerator pedal 26 is provided in the compartment of the vehicle in which the engine 1 is installed. To the accelerator pedal 26 is attached an accelerator position sensor 27 that generates an electric signal indicative of an amount of depression of the accelerator pedal 26 (which will be called "accelerator depression amount").

The internal combustion engine 1 constructed as described above is equipped with an electronic control unit (ECU) 25 for controlling the operating state of the engine 1. The ECU 25 is an arithmetic and logic unit that mainly consists of CPU, ROM, RAM, backup RAM and so forth. To the ECU 25 are electrically connected the above-mentioned air flow meter 14, throttle position sensor 17, phase difference sensor 20, working angle sensor 22 and the accelerator position sensor 27. In addition, a crank position sensor 23 and a water temperature sensor 24 attached to the engine 1 and a display device 28 located in the compartment of the vehicle in which the engine 1 is installed are electrically connected to the ECU 25.

Furthermore, the spark plug 5, fuel injectors 6 throttle actuator 16, timing changing mechanism 19 and the working angle changing mechanism 21 are electrically connected to the ECU 25. The ECU 25 controls the spark plug 5, fuel injectors 6, throttle actuator 16, timing changing mechanism 19, the working angle changing mechanism 21 and the display device 28, by using output signals of the above-mentioned sensors as parameters.

For example, the ECU 25 controls the intake air quantity of the engine 1 to a target intake air quantity by using the throttle actuator 16, timing changing mechanism 19 and the working angle changing mechanism 21. This control will be hereinafter called "intake air quantity control".

In the intake air quantity control, the ECU 25 initially calculates the engine speed according to the time intervals at which the crank position sensor 23 generates a pulse signal, and reads an output signal value (indicative of the accelerator depression amount) of the accelerator position sensor 27. The ECU 25 then calculates a target torque of the engine 1 by using the engine speed and the accelerator depression amount as parameters. The ECU 25 then calculates an intake air quantity (i.e., target intake air quantity) required for making the actual torque of the engine 1 equal to the target torque. In this calculation, the target intake air quantity is set so as to increase as the accelerator depression amount increases and the engine speed increases.

Figure 2:
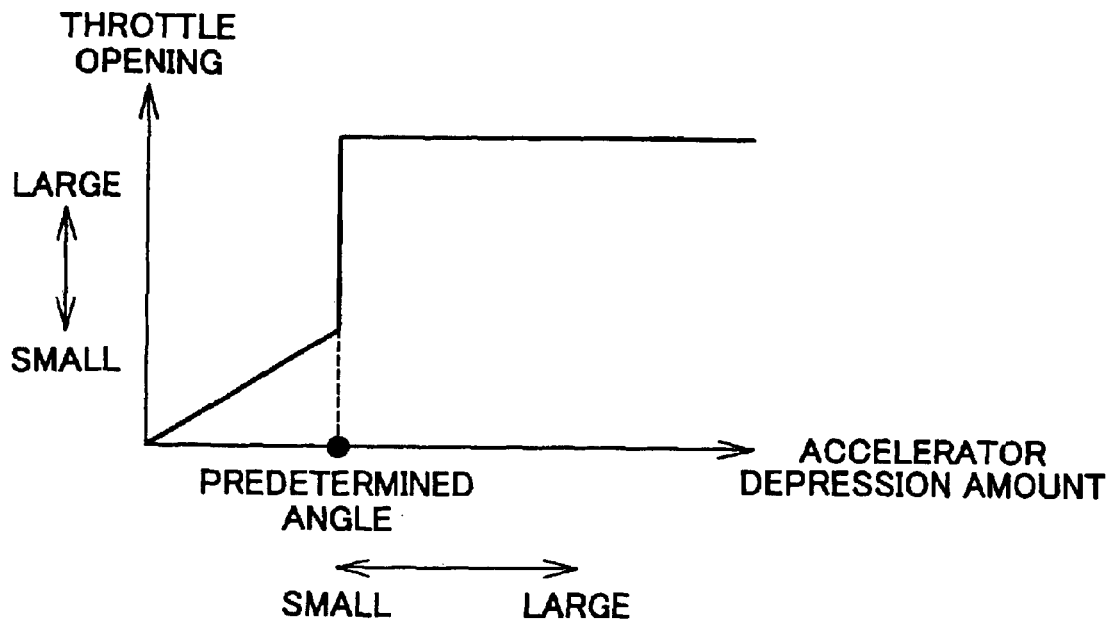
FIG. 2 is a graph showing the relationship between the throttle opening and the accelerator depression amount during a normal operation of the engine.

Subsequently, the ECU 25 determines an opening angle of the throttle valve 15, a difference of the rotational phase of the intake camshaft from that of the crankshaft, and a working angle of the intake valve 3, so that the output signal value of the air flow meter 14 (i.e., the actual intake air quantity) becomes equal to the target intake air quantity. More specifically, when the accelerator depression amount is smaller than a predetermined value, the ECU 25 controls the intake air quantity by changing the opening angle of the throttle valve 15, as shown in FIG. 2. When the accelerator depression amount is equal to or larger than the predetermined value, on the other hand, the ECU 25 controls the intake air quantity by using the timing changing mechanism 19 and the working angle changing mechanism 21 while keeping the throttle valve 15 at a substantially fully open position. The substantially fully open position of the throttle valve 15 is determined such that the air mass flow will not change (increase) even if the opening angle of the throttle valve 15 is increased from this position.

In an engine operating region in which the accelerator depression amount is smaller than the predetermined value, the ECU 25 controls the throttle actuator 16 so as to increase or decrease the opening angle of the throttle valve 15 by a degree proportional to the accelerator depression amount. At the same time, the ECU 25 controls the timing changing mechanism 19 and the working angle changing mechanism 21 in accordance with an output signal (indicative of the coolant temperature) of the water temperature sensor 24, an output signal (indicative of the accelerator depression amount) of the accelerator position sensor 27, and the engine speed.

When the coolant temperature is lower than a predetermined level, and the engine 1 is in an idling state (i.e., the accelerator pedal 26 is not depressed) or the engine speed is in a low speed region and the accelerator depression amount is smaller than a predetermined value, the ECU 25 controls the timing changing mechanism 19 so as to retard the opening timing of the intake valve 3 from the top dead center of the suction stroke, and controls the working angle changing mechanism 21 so as to set the closing timing of the intake valve 3 at around the bottom dead center of the suction stroke.

If the opening timing of the intake valve 3 is regarded from the top dead center of the suction stroke, the overlap duration of the intake valve 3 and the exhaust valve 4 is shortened, and therefore the amount of exhaust gas flowing from the inside of the cylinder 2 and/or the exhaust port back to the intake port (i.e., the amount of so-called internal EGR gas) is reduced. If the closing timing of the intake valve 3 is set at around the bottom dead center of the suction stroke, the amount of intake air flowing from the inside of the cylinder 2 back to the intake port after the cylinder 2 shifts from the suction stroke to the compression stroke is reduced, and therefore an otherwise possible reduction in the volumetric efficiency is suppressed.

Accordingly, when the coolant temperature is low, and the engine 1 is in an idling state or the accelerator depression amount is small and the engine speed is low, the amount of the internal EGR gas is reduced, and the reduction in the volumetric efficiency is suppressed, thus assuring stable combustion in the engine 1.

When the accelerator depression amount is smaller than a predetermined value, and the engine speed is in a middle speed region, the ECU 25 controls the timing changing mechanism 19 so as to advance the opening timing of the intake valve 3 from the top dead center of the suction stroke, and controls the working angle changing mechanism 21 so as to set the closing timing of the intake valve 3 at around the bottom dead center of the suction stroke.

If the opening timing of the intake valve 3 is advanced from the top dead center of the suction stroke, the valve overlap duration of the intake valve 3 and the exhaust valve 4 is prolonged, and therefore the amount of the internal EGR gas is increased, and pumping loss is reduced. If the closing timing of the intake valve 3 is set at around the bottom dead center of the suction stroke, the amount of intake air that flows from the inside of the cylinder 2 back to the intake port after the cylinder 2 shifts from the suction stroke to the compression stroke is reduced, and therefore an otherwise possible reduction in the volumetric efficiency is suppressed.

Accordingly, when the accelerator depression amount is smaller than the predetermined value, and the engine speed is in the middle speed region, the amount of the internal EGR gas can be increased and the pumping loss can be reduced while the reduction in the volumetric efficiency is suppressed, thus assuring improved quality of exhaust emissions and improved fuel consumption efficiency (or fuel economy).

In an engine operating region in which the accelerator depression amount is equal to or larger than the predetermined value, the ECU 25 fixes the throttle valve 15 at a substantially fully open position, and controls the timing changing mechanism 19 and the working angle changing mechanism 21 so as to adjust the intake air quantity of the engine 1.

More specifically, the ECU 25 controls the timing changing mechanism 19 so as to advance the opening timing of the intake valve 3 as the engine speed increases, thereby to increase the overlap duration of the intake valve 3 and the exhaust valve 4. Furthermore, the ECU 25 controls the working angle changing mechanism 21 so as to increase the working angle of the intake valve 3 (i.e., retard the closing timing of the intake valve 3) as the target intake air quantity of the engine 1 increases, thereby to increase the amount of fresh air supplied to the cylinder 2.

In the intake air quantity control as described above, the ECU 25 performs feedback control of the timing changing mechanism 19 according to the output signal of the phase difference sensor 20 so that the actual opening/closing timing of the intake valve 3 coincides with the target opening/closing timing, and performs feedback control of the working angle changing mechanism 21 according to the output signal of the working angle sensor 22 so that the actual working angle of the intake valve 3 coincides with the target working angle. Furthermore, the ECU 25 performs feedback control of the throttle actuator 16 according to the output signal of the throttle position sensor 17 so that the actual opening angle of the throttle valve 15 coincides with the target opening angle.

Through these feedback control operations, the opening/closing timing of the intake valve 3, the working angle of the intake valve 3, and the opening angle of the throttle valve 15 are controlled with improved accuracy, so that the intake air quantity can be controlled with improved accuracy.

In the case where a failure occurs in at least one of a throttle mechanism consisting of the throttle valve 15, throttle actuator 16 and the throttle position sensor 17, a timing changing system consisting of the timing changing mechanism 19 and the phase difference sensor 20, and a working angle changing system consisting of the working angle changing mechanism 21 and the working angle sensor 22, it becomes difficult to successfully accomplish the intake air quantity control as described above.

In this case, the actual intake air quantity of the engine 1 cannot be controlled to the target intake air quantity, and therefore the driveability and the quality of exhaust emissions of the engine 1 deteriorate, which may make it impossible to continue the operation of the engine 1.

To deal with the above situation, the control system of the internal combustion engine according to the present embodiment of the invention causes the ECU 25 to execute different fail-safe control processes depending upon different forms of failures, when a failure occurs in at least one of the throttle mechanism, timing changing system and the working angle changing system.

In the following, the fail-safe control processes according to the embodiment will be described. The cases where a failure occurs in at least one of the throttle mechanism, timing changing system and the working angle changing system include the case where a failure occurs only in the timing changing system, the case where a failure occurs only in the working angle changing system, the case where failures occur in both the timing changing system and the working angle changing system, the case where a failure occurs only in the throttle mechanism, and other cases.

(1) Fail-safe Control Process Executed in the Case Where a Failure Occurs Only in the Timing Changing System As a failure of the timing changing system, a failure of the timing changing mechanism 19 and/or a failure of the phase difference sensor 20 may be considered.

In one example of a method of detecting a failure of the timing changing mechanism 19, it is determined that the timing changing mechanism 19 is at fault when the output signal value of the phase difference sensor 20 does not change (i.e., the difference of the rotational phase of the intake camshaft from that of the crankshaft does not change) in accordance with a control signal value transmitted from the ECU 25 to the timing changing mechanism 19.

In one example of a method of detecting a failure of the phase difference sensor 20, it is determined that the phase difference sensor 20 is at fault when the output signal value of the phase difference sensor 20 is fixed at a higher or lower value than an output range of the sensor 20 established when it is normally operated.

(a) Case where a failure occurs in the timing changing mechanism

When a failure occurs in the timing changing mechanism 19, the ECU 25 is not able to change the rotational phase of the intake camshaft relative to that of the crankshaft, and therefore stops control of the timing changing mechanism 19.

The hardware structure of the timing changing mechanism 19 is arranged such that when the control of the timing changing mechanism 19 is stopped, the rotational phase of the intake camshaft relative to that of the crankshaft is fixed at the most retarded position.

Figure 3:
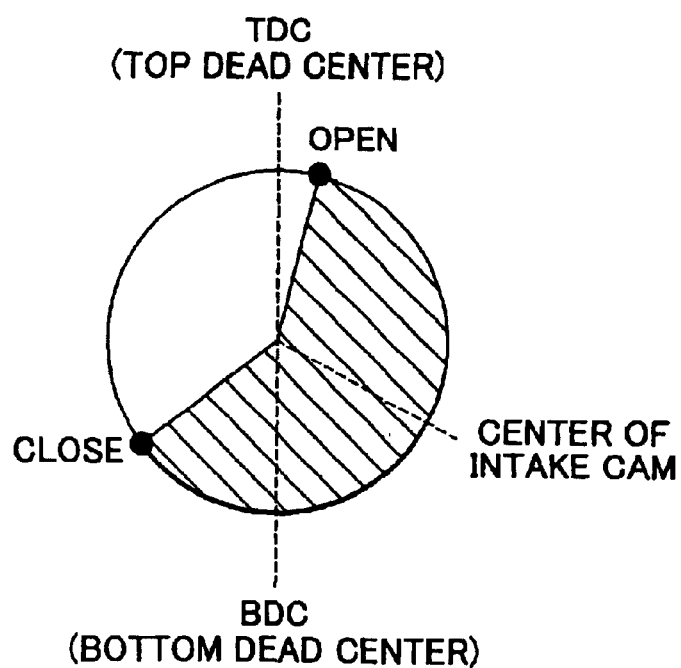
FIG. 3 is a view showing the opening/closing timing of an intake valve when the rotational phase of an intake camshaft relative to that of the crankshaft is set to the most retarded position, and the working angle is set to the maximum angle.

If the working angle changing mechanism 21 is controlled so that the working angle of the intake valve 3 becomes equal to the maximum angle when the rotational phase of the intake camshaft relative to that of the crankshaft is fixed at the most retarded position, the valve open duration of the intake valve 3 can be prolonged (i.e., the intake valve 3 can be held in an open state for a relatively long time), but the closing timing of the intake valve 3 is largely retarded from the bottom dead center of the suction stroke, as shown in FIG. 3. Therefore, air drawn into the cylinder 2 is likely to flow in the reverse direction to the intake port during the compression stroke, and the substantial duration of the compression stroke is reduced, resulting in unstable combustion in the engine 1.

Figure 4:
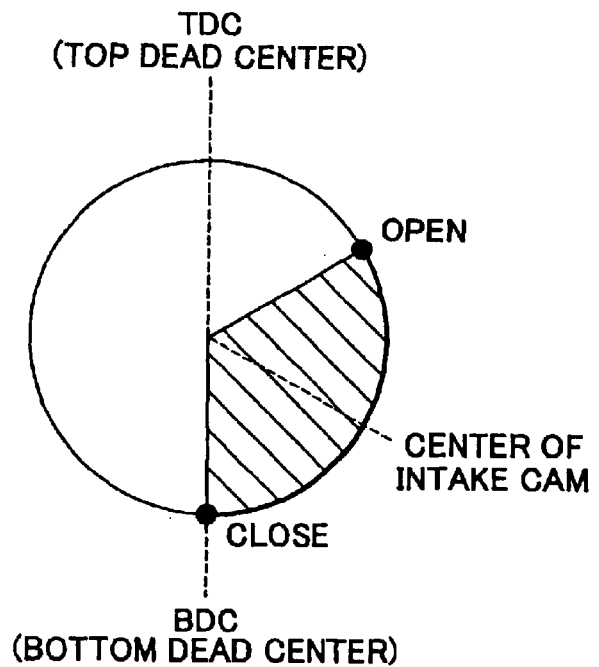
FIG. 4 is a view showing the opening/closing timing of the intake valve when the rotational phase of the intake camshaft relative to that of the crankshaft is set to the most retarded position, and the working angle is set to the minimum angle.

If the working angle changing mechanism 21 is controlled so that the working angle of the intake valve 3 becomes equal to the minimum angle when the rotational phase of the intake camshaft relative to that of the crankshaft is fixed at the most retarded position, the closing timing of the intake valve 3 is not largely retarded from the bottom dead center of the suction stroke, but the valve open duration of the intake valve 3 is considerably shortened, as shown in FIG. 4. Therefore, the amount of intake air drawn into the cylinder 2 is reduced, resulting in an excessive reduction in the torque of the engine 1.

Figure 5:
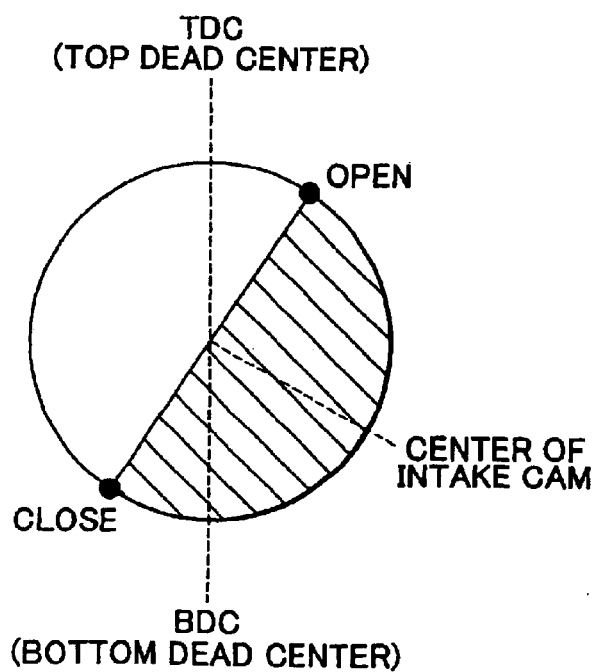
FIG. 5 is a view showing the working angle of the intake valve suitable for the case where a failure occurs in a timing changing mechanism.

In view of the above situations, in the fail-safe control process executed in the event of a failure in the timing changing mechanism 19, the ECU 25 fixes a control value applied to the working angle changing mechanism 21 to a certain value (which will be referred to as "first predetermined value") at which the working angle of the intake valve 3 becomes equal to a predetermined angle between the minimum angle and the maximum angle, as shown in FIG. 5, when the rotational phase of the intake camshaft relative to that of the crankshaft is fixed at the most retarded, position.

In this control, in order to improve the driveability of the engine 1 during running of the vehicle in a limp-home mode, it is desirable to improve the combustion stability of the engine 1 when the engine speed is in a low- or middle-speed region, rather than when the engine speed is in a high-speed region. Accordingly, the closing timing of the intake valve 3 is preferably set at a time when air drawn into the cylinder 2 does not flow in the reverse direction to the intake port, more specifically, set at around the bottom dead center of the suction stroke, and the working angle of the intake valve 3 is preferably fixed at an angle closer to the minimum angle than to the maximum angle.

If the rotational phase of the intake camshaft relative to that of the crankshaft is fixed at the most retarded position, and the working angle of the intake valve 3 is fixed at the predetermined angle, it becomes difficult to control the intake air quantity of the engine 1 to the target intake air quantity in an engine operating region in which the accelerator depression amount is equal to or larger than a predetermined amount (i.e., an operating region in which the throttle Valve 15 is held at a substantially fully open position). Accordingly, the ECU 25 controls the throttle actuator 16 so as to gradually increase the opening angle of the throttle valve 15 as the accelerator depression amount increases. In this case, it is desirable to control the throttle actuator 16 in a feedback manner so that the output signal value of the air flow meter 14 becomes equal to the target intake air quantity.

According to the fail-safe control process as described above, the intake air quantity can be approximated to the target intake air quantity while deterioration in the combustion stability is suppressed at least when the engine 1 is in a low- or middle-speed operating state. Thus, the fail-safe control enables the engine 1 to be operated at least at a low or middle speed. Consequently, the fail-safe control permits the vehicle in which the engine 1 is installed to run in a limp-home mode, while suppressing deterioration in the driveability and the quality of exhaust emissions during limp-home running of the vehicle.

Figure 7:
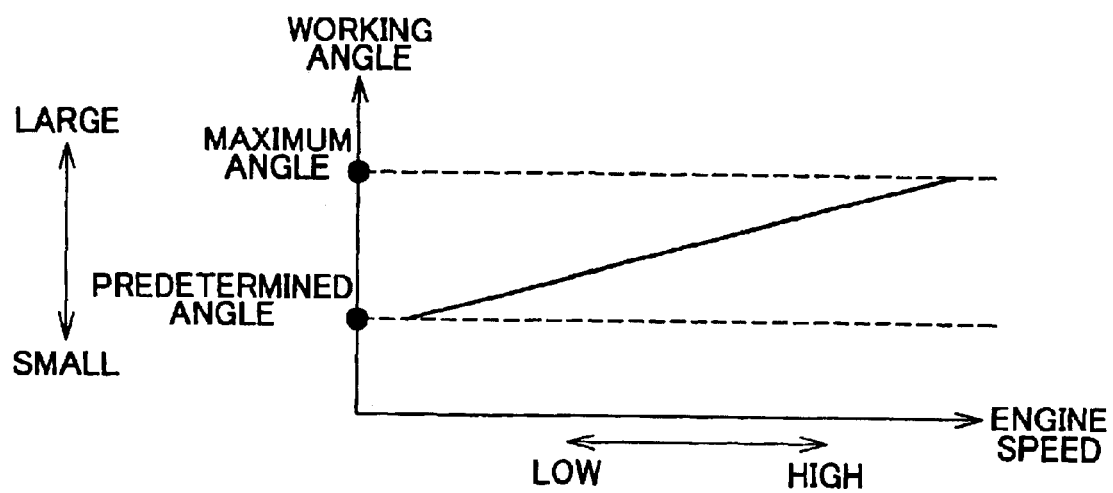
FIG. 7 is a graph showing the relationship between the working angle of the intake valve and the engine speed, which relationship is suitably employed in the case where a failure occurs in the timing changing mechanism.

In order to improve the driveability not only when the engine speed is in a low- or middle-speed region but also when it is in a high-speed region, the ECU 25 may control the working angle of the intake valve 3 to increase within a range from the predetermined angle up to the maximum angle as the engine speed increases, as shown in FIG. 7, while changing the opening angle of the throttle valve 15 in accordance with the accelerator depression amount in the engine operating region in which the accelerator depression amount is equal to or larger than the predetermined amount.

In this case, the reduction or deterioration in the combustion stability can be suppressed not only when the engine 1 is in a low- or middle-speed operating state but also when it is in a high-speed operating state, and therefore the vehicle in which the engine 1 is installed is able to run substantially in the same manner as during normal running.

(b) Case where a failure occurs in the phase difference sensor 20

When a failure occurs in the phase difference sensor 20, the ECU 25 is not able to perform feedback control of the difference of the rotational phase of the intake camshaft from that of the crankshaft, based on an output signal value of the phase difference sensor 20.

In this case, it becomes difficult to accurately control the rotational phase of the intake camshaft relative to that of the crankshaft, to a position other than the most advanced position and the most retarded position. It is thus desirable to fix the rotational phase of the intake camshaft relative to that of the camshaft at the most advanced position or the most retarded position.

If the rotational phase of the intake camshaft relative to that of the crankshaft is fixed at the most retarded position, it is difficult to change the intake air quantity of the engine 1 only by means of the working angle changing mechanism 21 in an engine operating region in which the accelerator depression amount is equal to or larger than the predetermined value (i.e., in an operating region in which the throttle valve 15 is fixed at a substantially fully open position), as described above with reference to FIG. 3 and FIG. 4.

Figure 8:
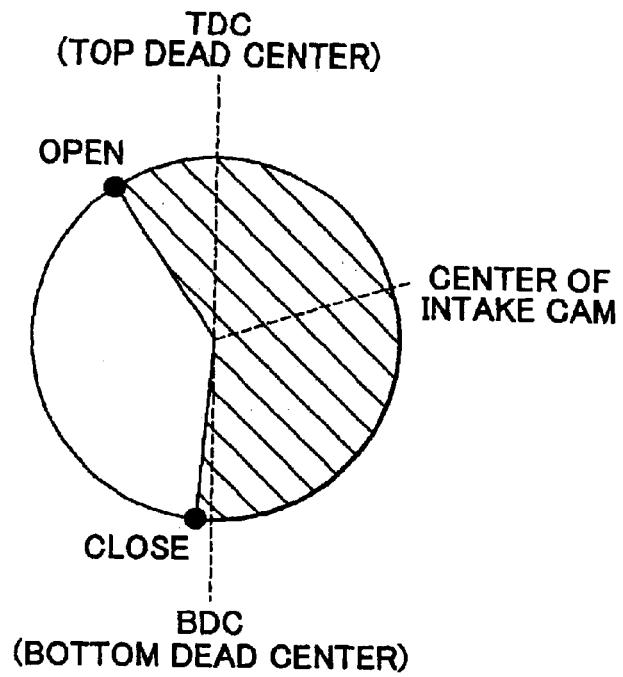
FIG. 8 is a view showing the opening/closing timing of the intake valve when the rotational phase of the intake camshaft relative to that of the crankshaft is set to the most advanced position, and the working angle is set to the maximum angle.

If the rotational phase of the intake camshaft relative to that of the crankshaft is fixed at the most advanced position, and the working angle changing mechanism 21 is controlled so that the working angle of the intake valve 3 becomes equal to the maximum angle, on the other hand, the opening timing of the intake valve 3 is advanced from the top dead center of the suction stroke, and the closing timing of the intake valve 3 is slightly retarded from the bottom dead center of the suction stroke, as shown in FIG. 8.

In this case, since the closing timing of the intake valve 3 is not excessively retarded from the bottom dead center of the suction stroke, the substantial duration of the compression stroke (or substantial compression period) is not excessively shortened, which leads to a high possibility of stable combustion in the engine 1. Meanwhile, since the valve overlap duration of the intake valve 3 and the exhaust valve 4 becomes relatively long, it is desirable to set the working angle of the intake valve 3 to a relatively large degree when the engine is in an operating region in which the volumetric efficiency of the intake air can be easily improved due to a pulsation effect of the exhaust gas, namely, in an operating region in which the accelerator depression amount is large and the engine speed is high.

Figure 9:
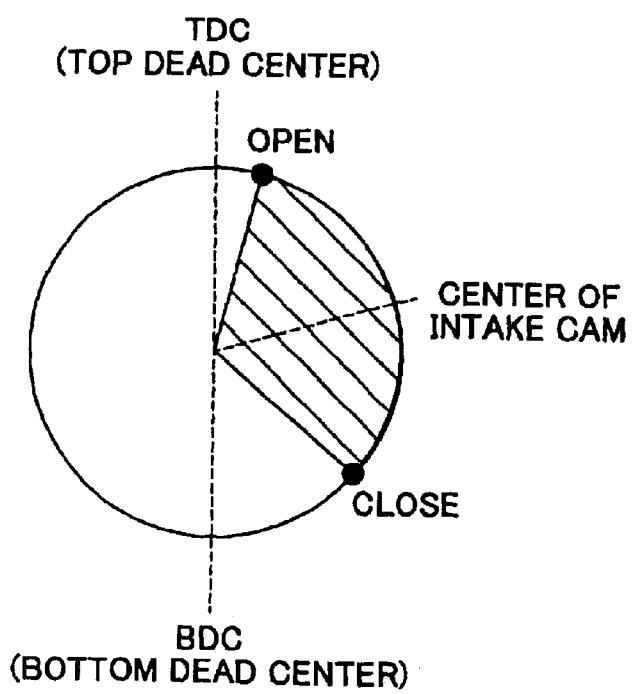
FIG. 9 is a view showing the opening/closing timing of the intake valve when the rotational phase of the intake camshaft relative to that of the crankshaft is set to the most advanced position, and the working angle is set to the minimum angle.

If the rotational phase of the intake camshaft relative to that of the crankshaft is fixed at the most advanced position, and the working angle changing mechanism 21 is controlled so that the working angle of the intake valve 3 becomes equal to the minimum angle, the opening timing of the intake valve 3 is retarded from the top dead center of the suction stroke, and the closing timing of the intake valve 3 is advanced from the bottom dead center of the suction stroke, as shown in FIG. 9.

In this case, since the valve overlap duration of the intake valve 3 and the exhaust valve 4 is shortened, and the closing timing of the intake valve 3 is advanced from the bottom dead center of the suction stroke, the volumetric efficiency of the intake air is less likely to be reduced, and the substantial compression duration is less likely to be reduced. Meanwhile, since the valve open duration of the intake valve 3 is shortened, it is desirable to set the working angle of the intake valve 3 to a relatively small degree in an engine operating region in which the target intake air quantity of the engine 1 is relatively small, namely, in an operating region in which the accelerator depression amount is small and the engine speed is low.

As is understood from the above description, when the rotational phase of the intake camshaft relative to that of the crankshaft is fixed at the most advanced position, the intake air quantity can be more easily controlled only by means of the working angle changing mechanism 21 as compared with the case where the rotational phase of the intake camshaft relative to that of the crankshaft is fixed at the most retarded position.

Figure 10:
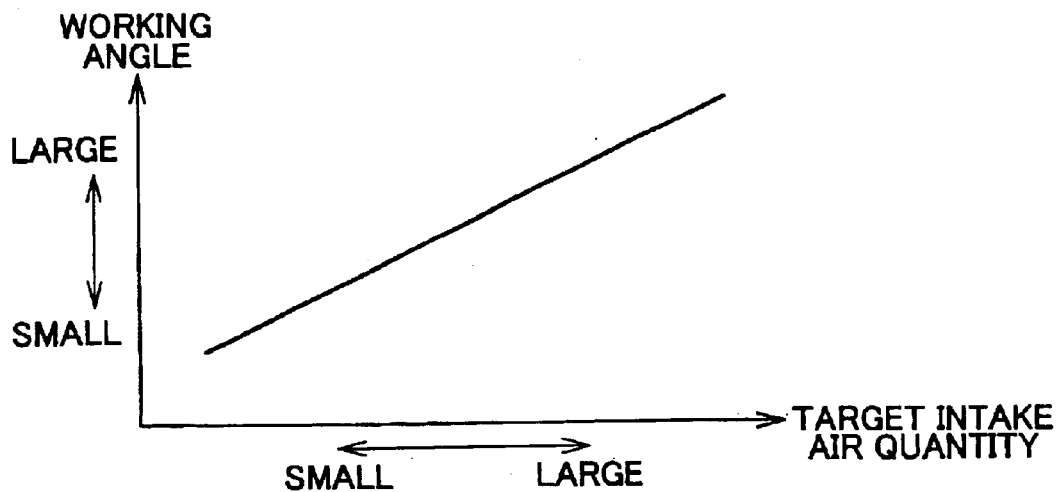
FIG. 10 is a graph showing the relationship between the working angle and the target intake air quantity, which relationship is suitably employed in the case where a failure occurs in a phase difference sensor.

In the fail-safe control process of the embodiment executed in the event of a failure in the phase difference sensor 20, therefore, the ECU 25 controls the working angle changing mechanism 21 so as to increase the working angle of the intake valve 3 in proportion to the target intake air quantity, as shown in FIG. 10, while controlling the timing changing mechanism 19 such that the rotational phase of the intake camshaft relative to that of the crankshaft is fixed at the most advanced position.

With the fail-safe control process executed in the manner as described above, the intake air quantity of the engine 1 can be controlled only with the working angle changing mechanism 21 in the engine operating region in which the accelerator depression amount is equal to or larger than the predetermined value (i.e., in the operating region in which the throttle valve 15 is fixed at a substantially fully open position).

Consequently, upon occurrence of a failure of the phase difference sensor 20, the intake air quantity can be controlled to the target intake air quantity without reducing the combustion stability of the engine 1, so that deterioration in the quality of exhaust emissions and the driveability can be suppressed, thus making it possible to run the vehicle in which the engine 1 is installed in substantially the same manner as in a normal operation thereof.

(2) Fail-safe Control Process Executed in the Case Where a Failure Occurs Only in the Working Angle Changing System As a failure of the working angle changing system, a failure of the working angle changing mechanism 21 and/or a failure of the working angle sensor 22 may be considered.

In one example of a method of detecting a failure of the working angle changing mechanism 21, it is determined that the working angle changing mechanism 21 is at fault when the output signal value of the working angle sensor 22 does not change (i.e., the working angle of the intake valve 3 does not change) in accordance with a control signal value transmitted from the ECU 25 to the working angle changing mechanism 21.

In one example of a method of detecting a failure of the working angle sensor 22, it is determined that the working angle sensor 22 is at fault when the output signal value of the working angle sensor 22 is fixed at a higher or lower value than an output range of the sensor 22 established when it is in a normal operation.

(a) Case where a failure occurs in the working angle changing mechanism 21

When a failure occurs in the working angle changing mechanism 21, the ECU 25 is not able to change the working angle of the intake valve 3, and therefore stops control of the working angle changing mechanism 21.

In general, the torque required for opening the intake valve 3 increases as the working angle of the intake valve 3 increases. Therefore, when the control of the working angle changing mechanism 21 is stopped, the working angle of the intake valve 3 is supposed to settle down to the minimum angle. In fact, however, the working angle of the intake valve 3 may change depending upon the relationship in magnitude between the torque required for opening the intake valve 3 and the friction in the working angle changing mechanism 21.

In the fail-safe control process according to the present embodiment, the ECU 25 stops control of the working angle changing mechanism 21, and controls the timing changing mechanism 19 in accordance with the actual working angle detected by the working angle sensor 22, so as to stabilize combustion in the engine 1. At the same time, the ECU 25 adjusts the intake air quantity by controlling the throttle actuator 16 in accordance with the accelerator depression amount detected by the accelerator position sensor 27.

Figure 11:
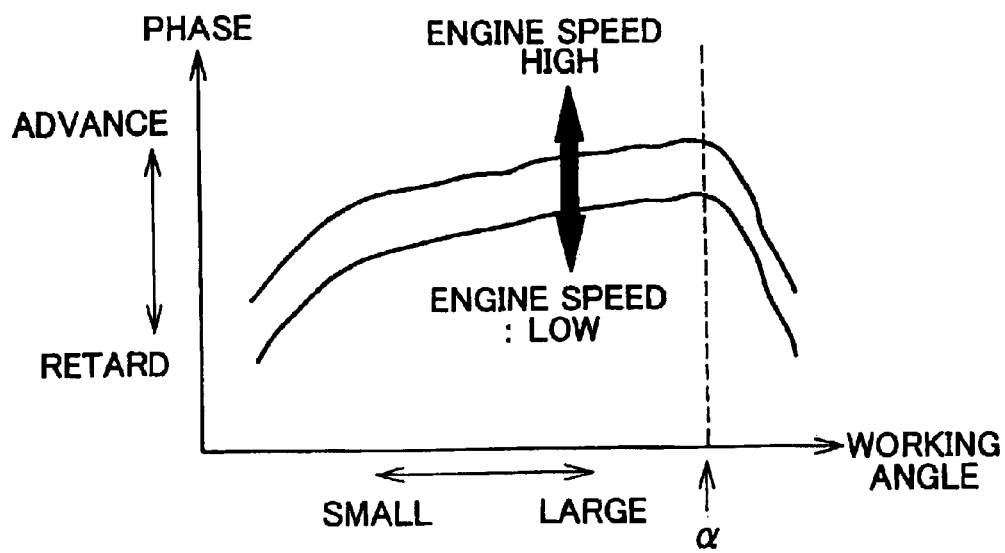
FIG. 11 is a graph showing the relationship among the rotational phase of the intake camshaft relative to that of the crankshaft, the engine speed and the working angle, which relationship is suitably employed in the case where a failure occurs in a working angle changing mechanism.

More specifically, the ECU 25 controls the timing changing mechanism 19 so as to advance the rotational phase of the intake camshaft relative to that of the crankshaft as the output signal value (indicative of the actual working angle) of the working angle sensor 22 increases and the engine speed increases, as shown in FIG. 11, thereby to increase the volumetric efficiency of the intake air.

When the actual working angle is approximate to the maximum angle, however, the intake air quantity tends to exceed the target intake air quantity. In a region in which the actual working angle is equal to or larger than a predetermined angle $\alpha$, therefore, it is desirable to control the timing changing mechanism 19 so as to retard the rotational phase of the intake camshaft relative to that of the crankshaft as the actual working angle increases and the engine speed decreases, thereby to reduce the volumetric efficiency of the intake air.

Figure 6:
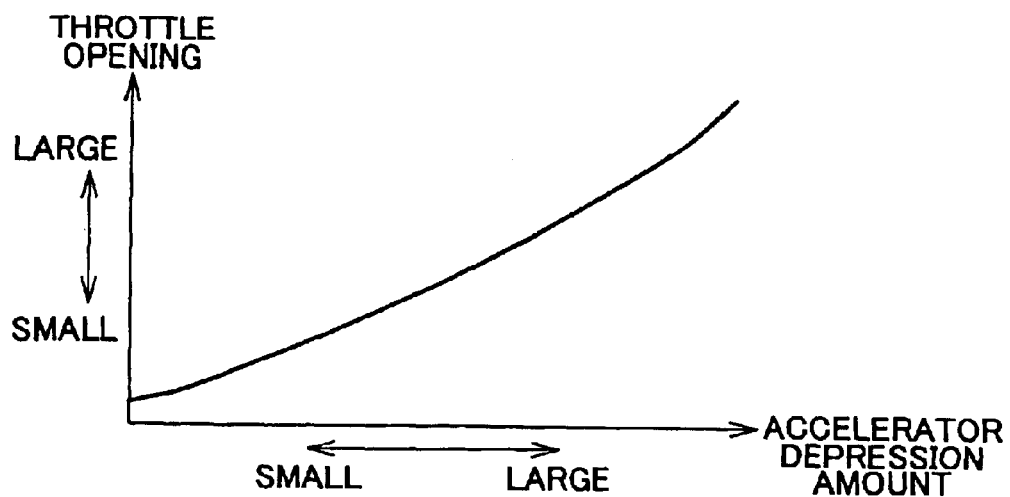
FIG. 6 is a graph showing the relationship between the throttle opening and the accelerator depression amount, which relationship is suitably employed in the case where a failure occurs in the timing changing mechanism.

Also, in the case where the working angle of the intake valve 3 cannot be controlled to a desired angle, it becomes difficult to control the intake air quantity of the engine 1 to the target intake air quantity in the engine operating region in which the accelerator depression amount is equal to or larger than the predetermined value (i.e., in the operating region in which the throttle valve 15 is fixed at a substantially fully open position). In this case, therefore, the ECU 25 controls the throttle actuator 16 so as to gradually increase the opening angle of the throttle valve 15 as the accelerator depression amount increases, as described above with reference to FIG. 6.

With the above-described fail-safe control process thus executed, the intake air quantity of the engine 1 can be approximated to the target intake air quantity while suppressing reduction in the combustion stability of the engine 1, thus permitting the engine 1 to continue operating while suppressing deterioration in the driveability and the quality of the exhaust emissions. Consequently, the vehicle in which the engine 1 is installed is able to run in substantially the same manner as when the engine 1 is normally operated.

(b) Case where a failure occurs in the working angle sensor 22

When a failure occurs in the working angle sensor 22, the ECU 25 is not able to control the working angle of the intake valve 3 in a feedback manner, based on the output signal value of the working angle sensor 22.

In this case, it becomes difficult to accurately control the working angle of the intake valve 3 to a working angle other than the maximum angle and the minimum angle, and therefore the ECU 25 fixes a control value applied to the working angle changing mechanism 21 to a second predetermined value that is set in advance.

For example, the second predetermined value is determined such that the working angle of the intake valve 3 becomes equal to or smaller than the working angle of intake valves employed in an internal combustion engine that is not equipped with the working angle changing mechanism 21, and, preferably, the working angle becomes more approximate to the minimum working angle than to the maximum working angle.

In this case, while the actual intake air quantity may become smaller than the target intake air quantity in an operating region in which the target intake air quantity is relatively large, the opening timing of the intake valve 3 is less likely to be excessively advanced from the top dead center of the suction stroke, and the closing timing of the intake valve 3 is less likely to be excessively retarded from the bottom dead center of the suction stroke.

Figure 12:
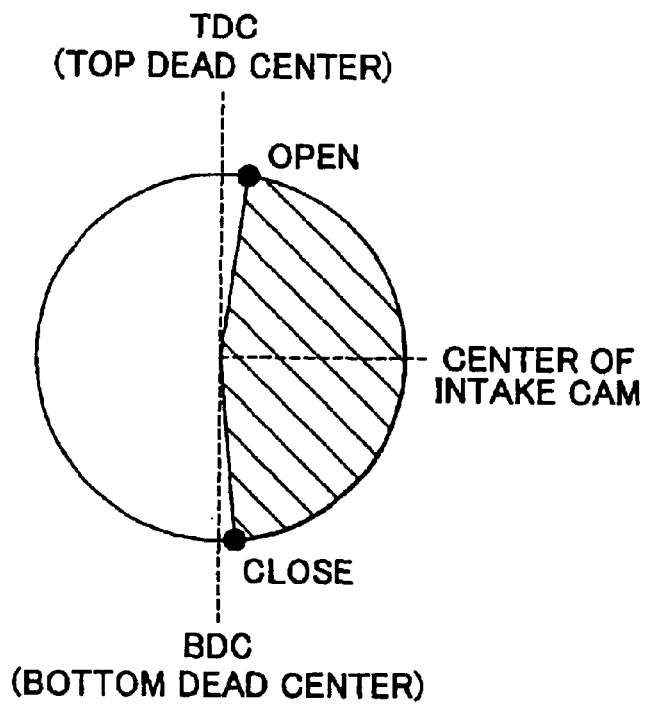
FIG. 12 is a view showing the opening/closing timing of the intake valve suitable for the case where a failure occurs in a working angle sensor.

Furthermore, the ECU 25 controls the timing changing mechanism 19 so that the opening timing of the intake valve 3 becomes close to the top dead center of the suction stroke, and the closing timing of the intake valve 3 becomes close to the bottom dead center of the suction stroke, as shown in FIG. 12.

At this time, it is preferable that the ECU 25 controls the timing changing mechanism 19 so as to retard the rotational phase of the intake camshaft relative to that of the crankshaft when the engine 1 is in an idling state, with respect to the rotational phase established when the engine 1 is in a non-idling state. This is because when the engine 1 is in an idling state, the combustion stability may be reduced due to an increase in the amount of the internal EGR gas if the valve overlap duration of the intake valve 3 and the exhaust valve 4 is long.

If the rotational phase of the intake camshaft relative to that of the crankshaft and the working angle of the intake valve 3 are fixed as described above, it becomes difficult to control the intake air quantity of the engine 1 to the target intake air quantity in the engine operating region in which the accelerator depression amount is equal to or larger than the predetermined value (i.e., in the operating region in which the throttle valve 15 is fixed at a substantially fully open position). Therefore, the ECU 25 controls the throttle actuator 16 so as to gradually increase the opening angle of the throttle valve 15 as the accelerator depression amount increases, as described above with reference to FIG. 6.

With the above-described fail-safe control process thus executed, the intake air quantity of the engine 1 can be approximated to the target intake air quantity while suppressing reduction in the combustion stability at least when the engine 1 is in an idling state or in a low- or middle-speed operating state, and therefore the engine 1 is able to continue operating at least in the idling state or at a low or middle speed even in the event of a failure of the working angle sensor 22.

Consequently, the vehicle in which the engine 1 is installed is able to run in a limp-home mode, and otherwise possible deterioration in the driveability and the quality of exhaust emissions during limp-home running can be suppressed.

(3) Fail-safe Control Process Executed in the Case Where Failures Occur in the Timing Changing System and the Working Angle Changing System The cases where failures occur in the timing changing system and the working angle changing system include the case where failures occur in the timing changing mechanism 19 and the working angle sensor 22, the case where failures occur in the timing changing mechanism 19 and the working angle changing mechanism 21, the case where failures occur in the phase difference sensor 20 and the working angle sensor 22, and the case where failures occur in the phase difference sensor 20 and the working angle changing mechanism 21.

(a) Case where failures occur in the timing changing mechanism 19 and the working angle sensor 22

When failures occur concurrently in the timing changing mechanism 19 and the working angle sensor 22, it becomes impossible to change the rotational phase of the intake camshaft relative to that of the crankshaft, and it becomes difficult to accurately control the working angle of the intake valve 3.

In the fail-safe control process executed in this case according to the present embodiment, the ECU 25 stops control of the timing changing mechanism 19, and fixes a control value applied to the working changing mechanism 21 to a third predetermined value. Since the rotational phase of the intake camshaft relative to that of the crankshaft is fixed to the most retarded position when control of the timing changing mechanism 19 is stopped, it is desirable to set the third predetermined value so that the working angle of the intake valve 3 becomes substantially equal to the predetermined angle as described above with reference to FIG. 5.

If the rotational phase of the intake camshaft relative to that of the crankshaft and the working angle of the intake valve 3 are fixed as described above, it becomes difficult to control the intake air quantity of the engine 1 to the target intake air quantity in the engine operating region in which the accelerator depression amount is equal to or larger than the predetermined value (i.e., in the operating region in which the throttle valve 15 is fixed at a substantially fully open position). Therefore, the ECU 25 controls the throttle actuator 16 so as to gradually increase the opening angle of the throttle valve 15 as the accelerator depression amount increases, as described above with reference to FIG. 6.

With the above-described fail-safe control process thus executed, the intake air quantity of the engine 1 can be approximated to the target intake air quantity while suppressing reduction in the combustion stability at least when the engine 1 is in a low- or middle-speed operating state, and therefore the engine 1 is able to continue operating at least at a low or middle speed.

Consequently, the vehicle in which the engine 1 is installed is able to run in a limp-home mode, and otherwise possible deterioration in the driveability and the quality of exhaust emissions during limp-home running can be suppressed.

When failures occur concurrently in the timing changing mechanism 19 and the working angle sensor 22, the ECU 25 may stop control of the timing changing mechanism 19 and control of the working angle changing mechanism 21, and may control the intake air quantity of the engine 1 only by changing the opening angle of the throttle valve 15. In this case, it becomes difficult to suppress reduction in the combustion stability of the engine 1, but the vehicle in which the engine 1 is installed is able to run in a limp-home mode.

(b) Case where failures occur in the timing changing mechanism 19 and the working angle changing mechanism 21

When failures occur concurrently in the timing changing mechanism 19 and the working angle changing mechanism 21, it becomes impossible to change the rotational phase of the intake camshaft relative to that of the crankshaft, and it also becomes impossible to change the working angle of the intake angle 3.

In the fail-safe control process executed in this case according to the present embodiment, the ECU 25 stops control of the timing changing mechanism 19 and control of the working angle changing mechanism 21, and controls the intake air quantity of the engine 1 by changing the opening angle of the throttle valve 15.

In the control of the intake air quantity, the ECU 25 controls the throttle actuator 16 so as to increase the opening angle of the throttle valve 15 as the accelerator depression amount increases, as described above with reference to FIG. 6, and also controls the throttle actuator 16 in a feedback manner, based on an output signal value of the air flow meter 14.

With the above-described fail-safe control process thus executed, at least the intake air quantity of the engine 1 can be approximated or made close to the target intake air quantity, thus permitting the vehicle in which the engine 1 is installed to run in a limp-home mode, though it is difficult to suppress reduction in the combustion stability of the engine 1.

(c) Case where failures occur in the phase difference sensor 20 and the working angle sensor 22

When failures occur concurrently in the phase difference sensor 20 and the working angle sensor 22, it becomes difficult to accurately control the rotational phase of the intake camshaft relative to that of the crankshaft to a position other than the most advanced position and the most retarded position, and it also becomes difficult to accurately control the working angle of the intake valve 3.

In the fail-safe control process to be executed in this case according to the present embodiment, the ECU 25 controls the timing changing mechanism 19 so as to fix the rotational phase of the intake camshaft relative to that of the crankshaft at the most advanced position, and fixes a control value applied to the working angle changing mechanism 21 to a fourth predetermined value.

Figure 14:
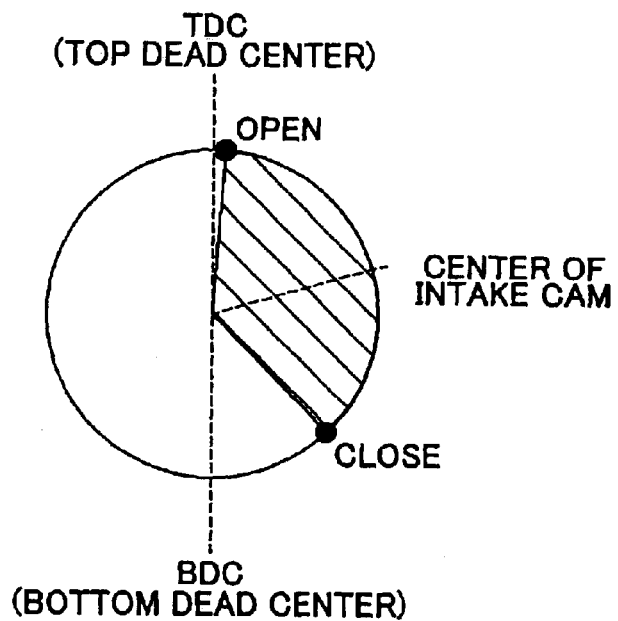
FIG. 14 is a view showing the opening/closing timing of the intake valve suitable for the case where failures occur in the phase difference sensor and the working angle sensor.

The fourth predetermined value is set to a value at which the opening timing of the intake valve 3 is at around the top dead center of the suction stroke as shown in FIG. 14, under a condition that the rotational phase of the intake camshaft relative to that of the crankshaft is fixed at the most advanced position. This is because, if the opening timing of the intake valve 3 is fixed at around the top dead center of the suction stroke, the intake air quantity measured when the engine speed is in a high-speed region may be insufficient, but reduction in the combustion stability that would occur when the engine speed is in an idle region or in a low- or middle-speed region can be suppressed.

If the rotational phase of the intake camshaft relative to that of the crankshaft and the working angle of the intake valve 3 are fixed as described above, it becomes difficult to control the intake air quantity of the engine 1 to the target intake air quantity in the engine operating region in which the accelerator depression amount is equal to or larger than the predetermined value (i.e., in the operating region in which the throttle valve 15 is fixed at a substantially fully open position). Therefore, the ECU 25 controls the throttle actuator 16 so as to gradually increase the opening angle of the throttle valve 15 as the accelerator depression amount increases, as described above with reference to FIG. 6.

With the above-described fail-safe control process thus executed, it is possible to approximate the intake air quantity of the engine 1 to the target intake air quantity while suppressing reduction in the combustion stability at least when the engine 1 is in a low- or middle-speed operating state, thus permitting the engine 1 to continue operating at least at a low or middle speed. Consequently, the vehicle in which the engine 1 is installed is able to run in a limp-home mode, while deterioration in the driveability and the quality of exhaust emissions during limp-home running of the vehicle can be suppressed.

(d) Case where failures occur in the phase difference sensor 20 and the working angle changing mechanism 21

When failures occur concurrently in the phase difference sensor 20 and the working angle changing mechanism 21, it becomes difficult to accurately control the rotational phase of the intake camshaft relative to that of the crankshaft to a position other than the most retarded position and the most advanced position, and it also becomes impossible to change the working angle of the intake valve 3.

In the fail-safe control process to be executed in the above case according to the present embodiment, the ECU 25 controls the timing changing mechanism 19 to fix the rotational phase of the intake camshaft relative to that of the crankshaft to the most advanced position, and stops control of the working angle changing mechanism 21.

In this case, the opening timing of the intake valve 3 may be advanced from the top dead center of the suction stroke, but the closing timing of the intake valve 3 is not largely retarded from the bottom dead center of the suction stroke, as described above with reference to FIG. 8 and FIG. 9. Therefore, reduction in the combustion stability can be suppressed to the minimum when the engine 1 is in a low- or middle-speed operating state.

If the rotational phase of the intake camshaft relative to that of the crankshaft is fixed, and control of the working angle changing mechanism 21 is stopped, it becomes impossible to change the intake air quantity of the engine 1 in the engine operating region in which the accelerator depression amount is equal to or larger than the predetermined value (i.e., in the operating region in which the throttle valve 15 is fixed at a substantially fully open state). Therefore, the ECU 25 controls the throttle actuator 16 so as to gradually increase the opening angle of the throttle valve 15 as the accelerator depression amount increases, as described above with reference to FIG. 6.

With the above-described fail-safe control process thus executed, it is possible to approximate the intake air quantity of the engine 1 to the target intake air quantity while suppressing reduction in the combustion stability at least when the engine 1 is in a low- or middle-speed operating state, thus permitting the engine 1 to continue operating at least at a low or middle speed. Consequently, the vehicle in which the engine 1 is installed is able to run in a limp-home mode, while deterioration in the driveability and the quality of exhaust emissions during limp-home running of the vehicle can be suppressed.

(4) Case Where a Failure Occurs in the Throttle Mechanism

The cases where a failure occurs in the throttle mechanism include the case where a failure occurs in a drive system of the throttle mechanism due to, for example, sticking of the throttle valve 15 or a poor operation of the throttle actuator 16, which makes it impossible to change the opening angle of the throttle valve 15, and the case where a failure occurs in the throttle position sensor 17.

In one example of a method of detecting a failure of the drive system of the throttle mechanism, it is determined that the drive system of the throttle mechanism is at fault when the output signal value of the throttle position sensor 17 does not change (namely, the opening angle of the throttle valve 15 does not change) in accordance with a control signal value transmitted from the ECU 25 to the throttle actuator 16.

In one example of a method of detecting a failure of the throttle position sensor 17, it is determined that the throttle position sensor 17 is at fault when the output signal value of the throttle position sensor 17 is fixed at a higher or lower value than the output range of the sensor 17 established when it is normally operated.

(a) Case where a failure occurs in the drive system of the throttle mechanism

If a failure occurs in the drive system of the throttle mechanism, the opening angle of the throttle valve 15 is fixed. Therefore, it becomes impossible to control the opening angle of the throttle valve 15 in proportion to the accelerator depression amount in an engine operation region in which the accelerator depression amount is smaller than the predetermined value, and it also becomes impossible to fix the throttle valve 15 at a substantially fully open position in an engine operating region in which the accelerator depression amount is equal to or larger than the predetermined value.

Figure 15:
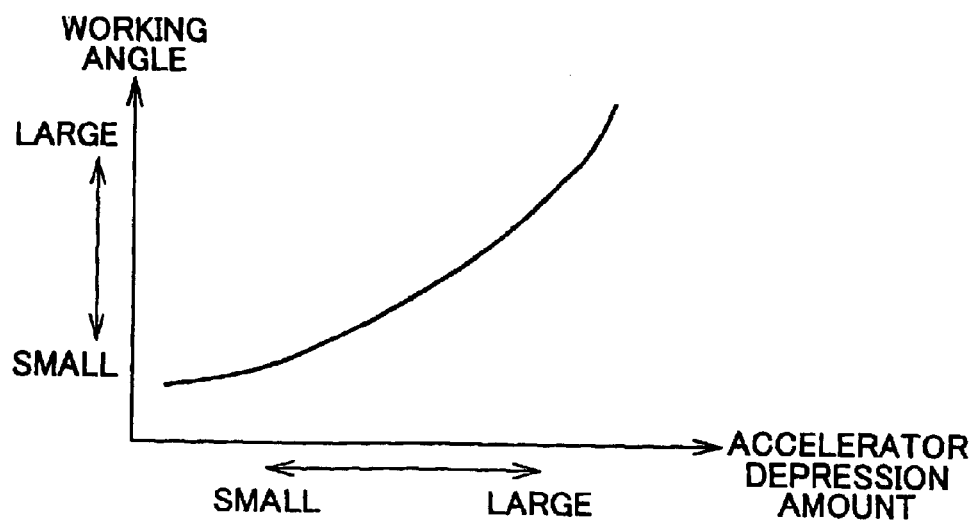
FIG. 15 is a graph showing the relationship between the working angle and the accelerator depression amount, which relationship is suitably employed in the case where a failure occurs in a drive system of a throttle mechanism.
Figure 16:
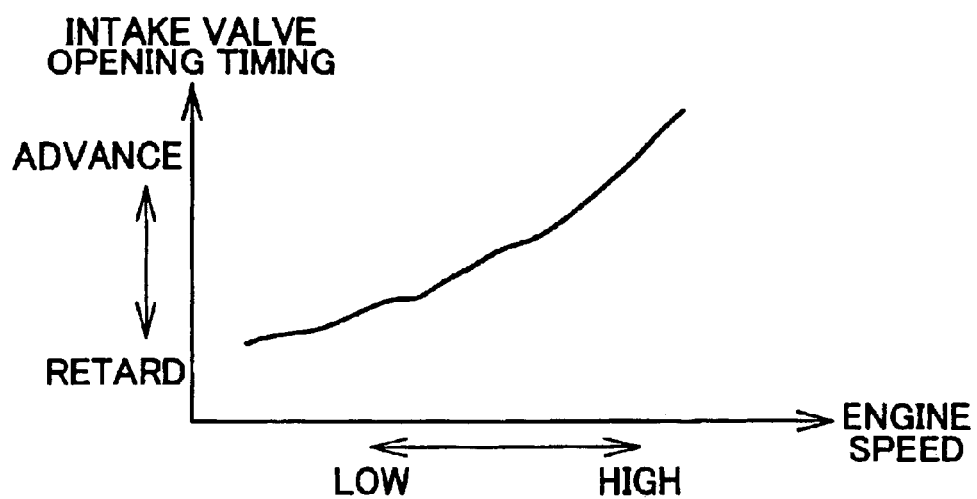
FIG. 16 is a graph showing the relationship between the opening timing of the intake valve and the engine speed, which relationship is suitably employed in the case where a failure occurs in the drive system of the throttle mechanism.

In the fail-safe control process to be executed in the above case according to the present embodiment, the ECU 25 stops control of the throttle actuator 16, and controls the working angle changing mechanism 21 so as to increase the working angle of the intake valve 3 as the accelerator depression amount increases, as shown in FIG. 15, while at the same time controlling the timing changing mechanism 19 so as to advance the opening timing of the intake valve 3 as the engine speed increases, as shown in FIG. 16.

In the above control, the actual intake air quantity of the engine 1 may exceed the target intake air quantity depending upon the opening angle to which the throttle valve 15 is fixed, and the torque of the engine 1 may be accordingly increased to be greater than the torque corresponding to the accelerator depression amount.

Figure 17:
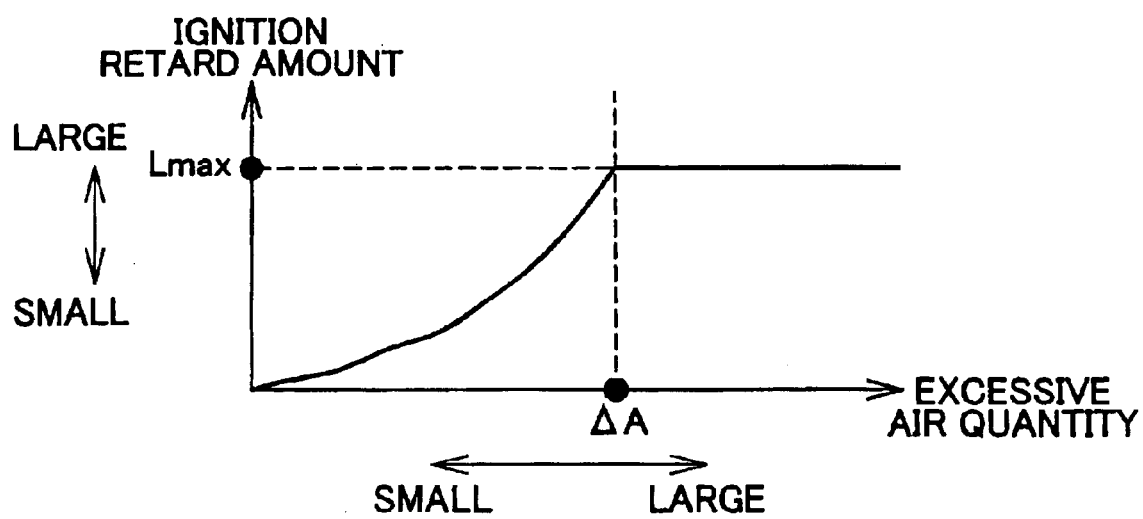
FIG. 17 is a graph showing the relationship between the ignition retard amount and the excessive air quantity, which relationship is suitably employed in the case where a failure occurs in the drive system of the throttle mechanism.

In this case, the ECU 25 calculates an excessive air quantity by subtracting the target intake air quantity from the actual intake air quantity, and controls the spark plug 5 so as to increase a retard or delay amount of the ignition timing as the excessive air quantity increases. It is, however, to be noted that misfire may occur in the engine 1 if the retard amount of the ignition timing is excessively large. In the present embodiment, therefore, an excessive air quantity ΔA (which will be called "retard limit air quantity") at which the delay amount of the ignition timing becomes equal to a limit value Lmax is empirically obtained in advance, and the delay amount is fixed to the limit value Lmax when the excessive air quantity is equal to or larger than the retard limit air quantity ΔA, as shown in FIG. 17.

Figure 18:
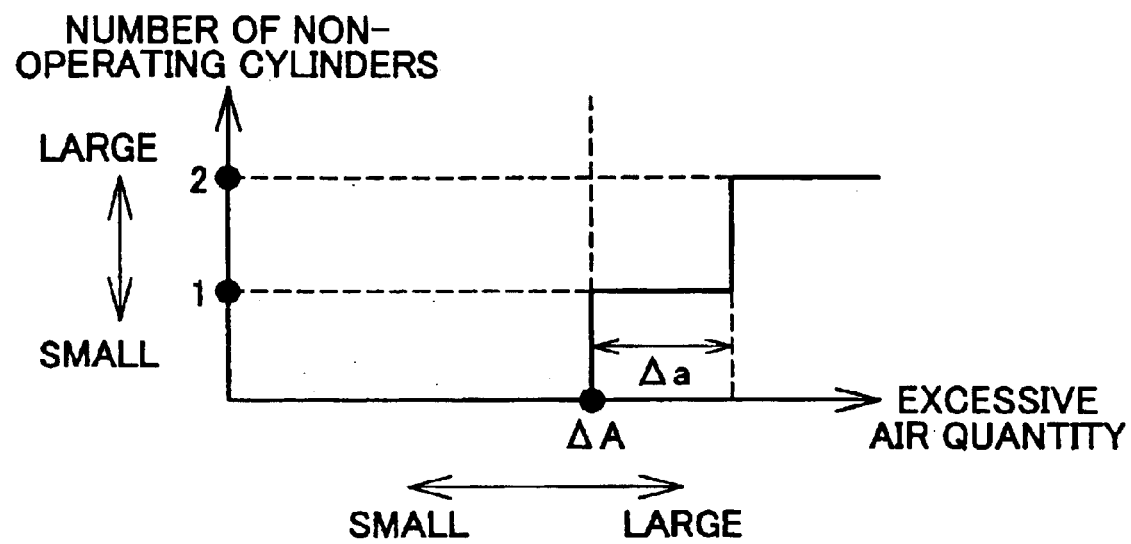
FIG. 18 is a graph showing the relationship between the number of non-operating cylinders and the excessive air quantity, which relationship is suitably employed in the case where a failure occurs in the drive system of the throttle mechanism.

When the excessive air quantity becomes equal to or larger than the retard limit air quantity ΔA, the ECU 25 reduces the number of operating cylinders of the engine 1 as the excessive air quantity increases. For example, the ECU 25 increases the number of non-operating (or rest) cylinders by one each time the excessive air quantity increases by a predetermined amount Δa, as shown in FIG. 18.

With the above-described fail-safe control process thus executed, the engine 1 is able to continue operating, while the torque of the engine 1 can be approximated to the torque corresponding to the accelerator depression amount. Consequently, the vehicle in which the engine 1 is installed is able to run in a limp-home mode.

(b) Case where a failure occurs in the throttle position sensor 17

If a failure occurs in the throttle position sensor 17, it becomes impossible to accurately control the opening angle of the throttle valve 15, and therefore the ECU 25 stops control of the throttle actuator 16. In a normal throttle mechanism, the opening angle of the throttle valve is fixed to a predetermined angle close to the minimum opening angle when control of the throttle actuator is stopped.

If the control as described above with reference to FIG. 15 through FIG. 18 is performed when the opening angle of the throttle valve 15 is fixed at the predetermined angle close to the minimum opening angle, the intake air quantity of the engine 1 may be insufficient when the engine 1 is in a high-speed operating state, but the intake air quantity can be easily controlled to the target intake air quantity when the engine 1 is in a low- or middle-speed operating state.

Accordingly, in the fail-safe control process according to the present embodiment, the ECU 25 stops control of the throttle actuator 16, and performs the control as described above with reference to FIG. 15 through FIG. 18.

In this case, it is possible to approximate the intake air quantity of the engine 1 to the target intake air quantity while suppressing reduction in the combustion stability at least when the engine 1 is in a low- or middle-speed operating state, thus permitting the engine 1 to continue operating at a low or middle speed. Consequently, the vehicle in which the engine 1 is installed is able to run in a limp-home mode, while deterioration in the driveability and the quality of exhaust emissions during limp-home running can be suppressed.

If a failure occurs in a throttle position sensor of a throttle mechanism that is constructed such that a throttle valve is held in a substantially fully closed position when control of a throttle actuator is stopped, the control as described above with reference to FIG. 15 through FIG. 18 may be performed after a control value applied to the throttle actuator is set to a value that makes the opening angle of the throttle valve equal to the above-described predetermined angle.

(4) Case Where Failures Occur in at Least One of the Timing Changing System and the Working Angle Changing System and the Throttle Mechanism When failures occur concurrently in at least one of the timing changing system and the working angle changing system, and in the throttle mechanism, the ECU 25 stops control of the throttle actuator 16, the timing changing mechanism 19 and the working angle changing mechanism 21, and stops control of the spark plug 5 and the fuel injectors 6 so as to stop the operation of the engine 1 while displaying information on occurrence of the failures on the display device 28.

If, however, the drive system of the throttle mechanism operates normally and the opening angle of the throttle valve 15 can be fixed to a predetermined angle, or the drive system fails to operate normally while the throttle valve 15 is held at a position other than the fully closed position, the ECU 25 may stop control of the timing changing mechanism 19 and the working angle changing mechanism 21, and then execute control for retarding ignition timing and control for operating a reduced number of cylinders, so that the engine 1 can continue operating with the torque of the engine 1 being adjusted through the controls.

A method of executing the fail-safe control processes according to the present embodiment will be now described with reference to FIG. 19 through FIG. 24.

Figure 19:
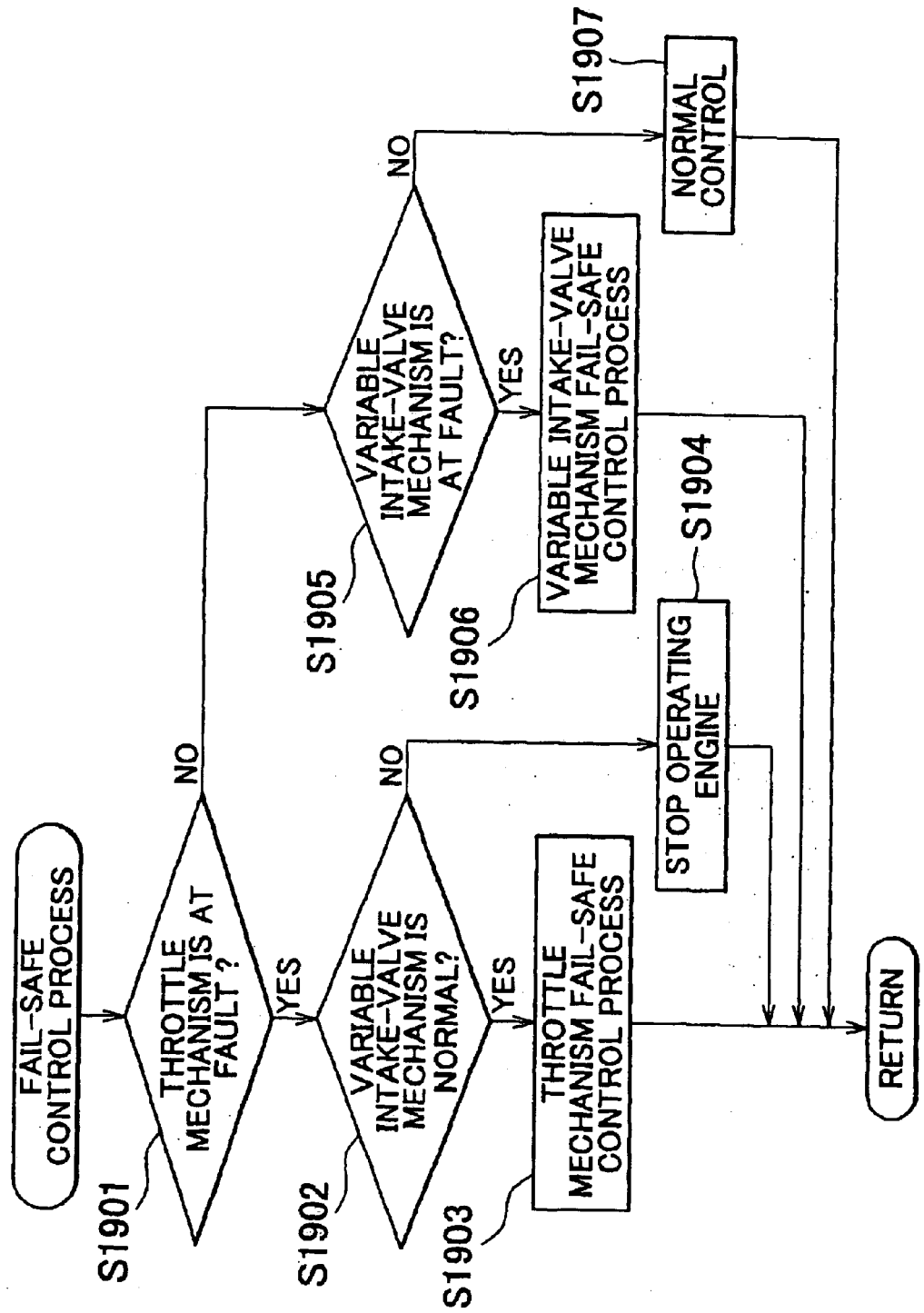
FIG. 19 is a flowchart showing a fail-safe control routine.

FIG. 19 is a flowchart showing a fail-safe control routine. The fail-safe control routine is stored in advance in the ROM of the ECU 25, and is executed by the ECU 25 at predetermined time intervals (for example, each time the crank position sensor 23 generates a pulse signal).

In the fail-safe control routine, the ECU 25 initially determines in step S1901 whether a failure occurs in the throttle mechanism. More specifically, the ECU 25 determines whether the output signal value of the throttle position sensor 17 is within the output range of the normally operating sensor 17. If the output signal value of the throttle position sensor 17 is within the normal output range, the ECU 25 then determines whether the output signal value of the throttle position sensor 17 changes in accordance with the control signal applied to the throttle actuator 16.

If it is determined in step S1901 that the output signal value of the throttle position sensor 17 is outside the normal output range, or the output signal value of the throttle position sensor 17 does not change in accordance with the control signal value transmitted from the ECU 25 to the throttle actuator 16, the ECU 25 determines that a failure occurs in the throttle mechanism, and proceeds to step S1902.

In step S1902, the ECU determines whether a variable intake-valve mechanism consisting of the timing changing system and the working angle changing system operates normally. More specifically, the ECU 25 determines whether the timing changing mechanism 19 operates normally, whether the phase difference sensor 20 operates normally, whether the working angle changing mechanism 21 operates normally, and whether the working angle sensor 22 operates normally.

When it is determined in step S1902 that all of the timing changing mechanism 19, the phase difference sensor 20, the working angle changing mechanism 21 and the working angle sensor 22 operate normally, the ECU 25 determines that the variable intake-valve mechanism operates normally, and proceeds to step S1903.

Figure 20A:
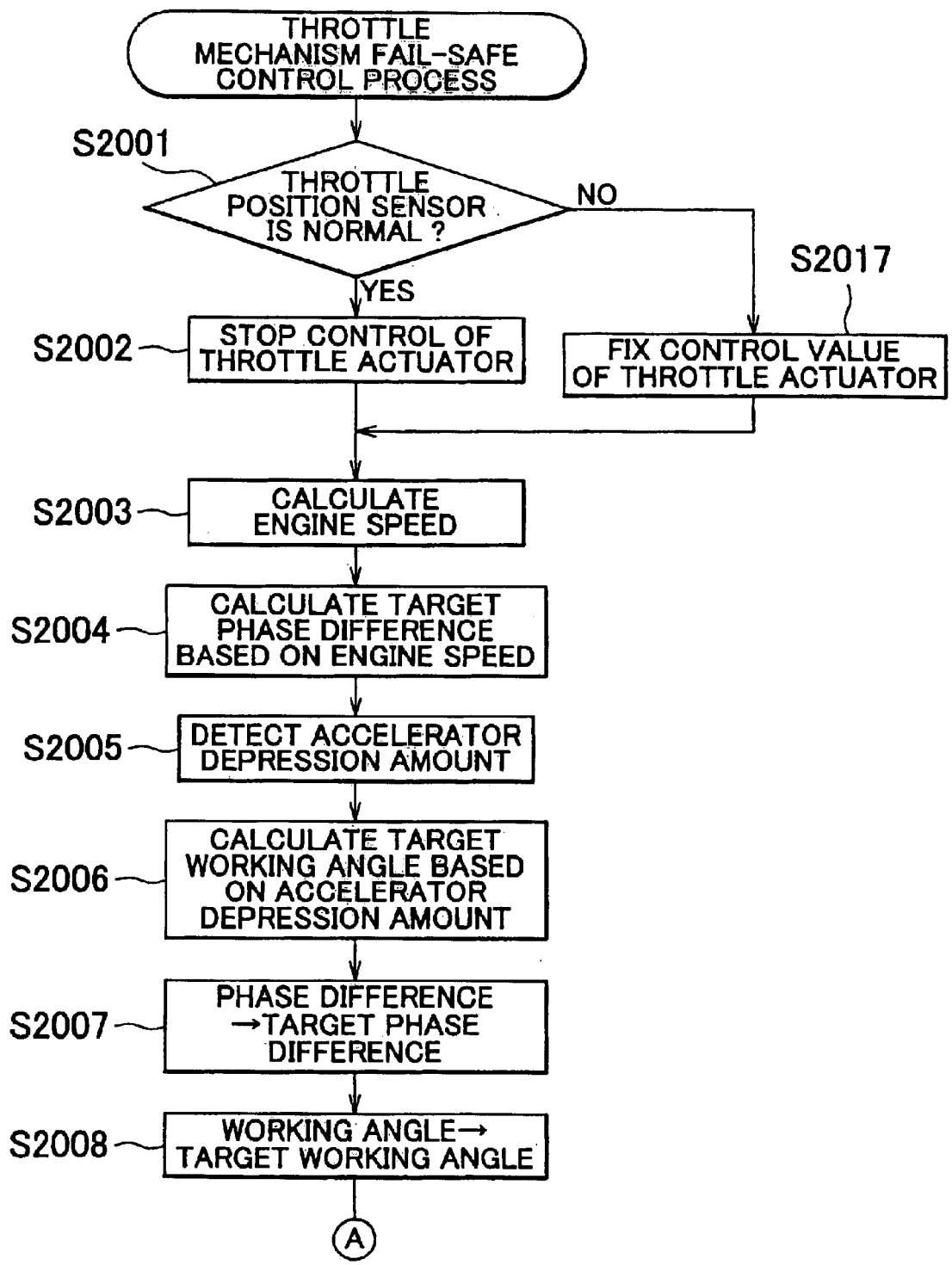
FIG. 20A and FIG. 20B show a flowchart showing a throttle mechanism fail-safe control routine.
Figure 20B:
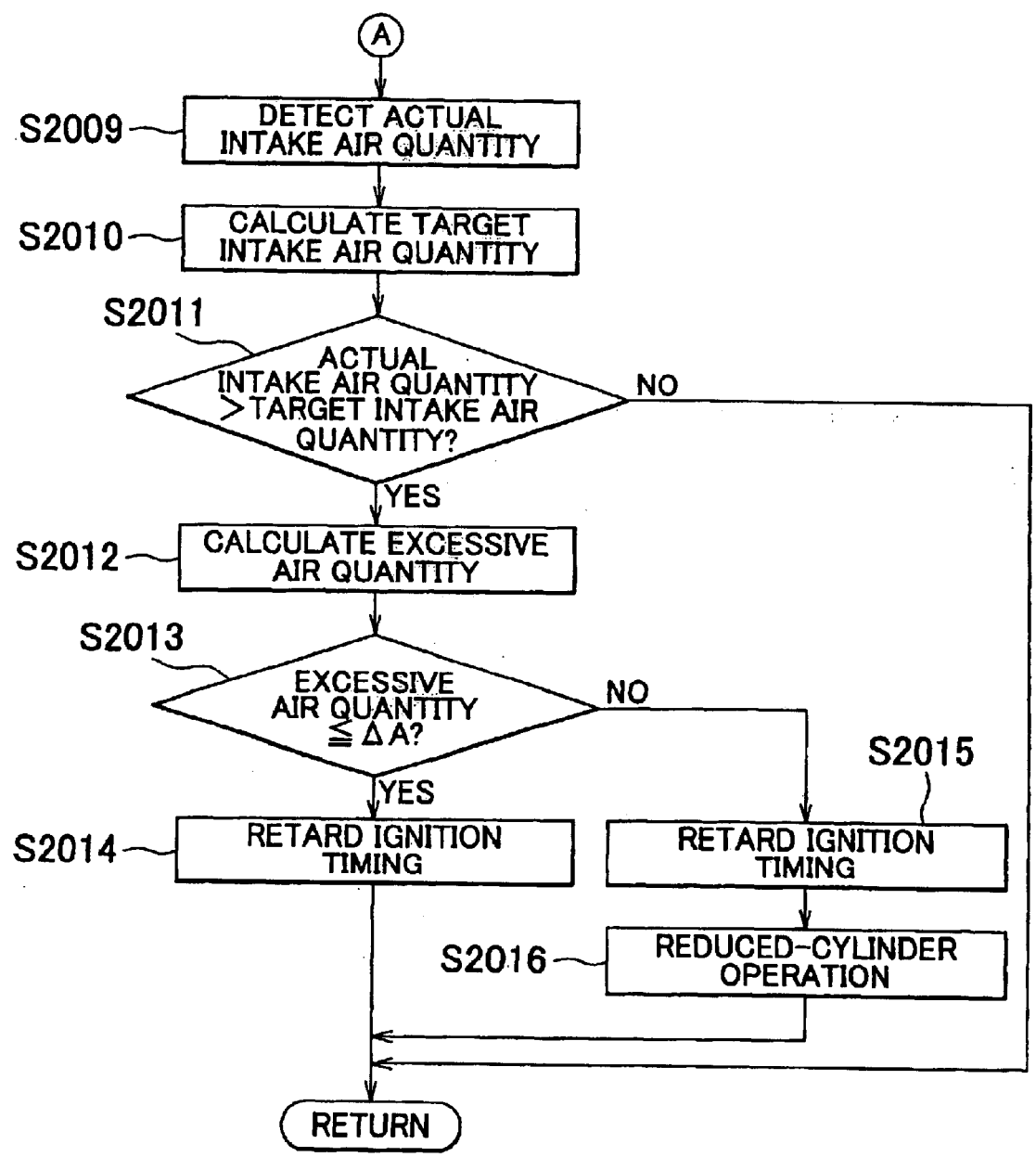

In step S1903, the ECU 25 displays information indicating occurrence of a failure on the display device 28, and executes a throttle mechanism fail-safe control process. In the throttle mechanism fail-safe control process, the ECU 25 executes a throttle mechanism fail-safe control routine as shown in FIGS. 20A, 20B. The throttle mechanism fail-safe control routine is stored in advance in the ROM of the ECU 25, and is executed by the ECU 25 when the throttle mechanism is at fault and the variable intake-valve mechanism operates normally.

In the throttle mechanism fail-safe control routine, the ECU 25 initially determines in step S2001 whether the output signal value of the throttle position sensor 17 is in the normal output range of the sensor 17.

If step S2001 determines that the output signal value of the throttle position sensor 17 is within the normal output range, the ECU 25 determines that the throttle position sensor 17 operates normally, and the drive system of the throttle mechanism is at fault, and proceeds to step S2002.

In step S2002, the ECU 25 stops control of the throttle actuator 16. In step S2003, the ECU 25 calculates the engine speed based on time intervals at which the crank position sensor 23 generates a pulse signal.

In step S2004, the ECU 25 calculates the phase difference (target phase difference) corresponding to the engine speed calculated in step S2003, according to the relationship between the engine speed and the opening timing of the intake valve 3 as described above with reference to FIG. 16. The "phase difference" mentioned herein means the difference of the rotational phase of the intake camshaft from that of the crankshaft.

In step S2005, the ECU 25 reads an output signal value (indicative of the accelerator depression amount) of the accelerator position sensor 27. In step S2006, the ECU 25 calculates the working angle (target working angle) of the intake valve 3 corresponding to the accelerator depression amount read in step S2005, according to the relationship between the accelerator depression amount and the working angle as described above with reference to FIG. 15.

In step S2007, the ECU 25 controls the timing changing mechanism 19 so that the difference of the rotational phase of the intake camshaft from that of the crankshaft becomes equal to the target phase difference. In step S2008, the ECU 25 controls the working angle changing mechanism 21 so that the actual working angle of the intake valve 3 becomes equal to the target working angle.

In step S2009, the ECU 25 reads an output signal value (i.e., actual intake air quantity) of the air flow meter 14. In step S2010, the ECU 25 calculates the target intake air quantity of the engine 1, using the engine speed calculated in step S2003 and the accelerator depression amount read in step S2005 as parameters.

In step S2011, the ECU 25 determines whether the actual intake air quantity read in step S2009 exceeds the target intake air quantity calculated in step S2010. If it is determined in step S2011 that the actual intake air quantity is equal to or smaller than the target intake air quantity, the ECU 25 once finishes execution of the present routine.

If it is determined in step S2011 that the actual intake air quantity exceeds the target intake air quantity, the ECU 25 proceeds to step S2012 to calculate an excessive air quantity by subtracting the target intake air quantity from the actual intake air quantity.

In step S2013, the ECU 25 determines whether the excessive air quantity calculated in step S2012 is equal to or smaller than the retard limit air quantity $\Delta A$. If it is determined in step S2013 that the excessive air quantity is equal to or smaller than the retard limit air quantity $\Delta A$, the ECU 25 proceeds to step S2014 to calculate the ignition retard amount corresponding to the excessive air quantity, according to the relationship between the ignition retard amount and the excessive air quantity as described above with reference to FIG. 17. The ECU 25 then retards or delays the ignition timing of the spark plug 5 by the ignition retard amount.

If it is determined in step S2013 that the excessive air quantity exceeds the retard limit air quantity ΔA, the ECU 25 proceeds to step S2015 to retard the ignition timing of the spark plug 5 by the limit value Lmax. The ECU 25 then proceeds to step S2016 to calculate the number of the non-operating cylinders corresponding to the excessive air quantity, according to the relationship between the number of the non-operating cylinders and the excessive air quantity as described above with reference to FIG. 18. The ECU 25 then operates the engine 1 with the operating (i.e., remaining) cylinders, according to the number of the non-operating cylinders thus calculated.

If it is determined in the above step S2001 that the throttle position sensor 17 is at fault, the ECU 25 proceeds to step S2017 to fix the control value applied to the throttle actuator 16 to a value that makes the opening angle of the throttle valve 15 equal to a predetermined angle that is close to the minimum opening angle.

Subsequently, the ECU 25 executes a process similar to the process of steps S2003 through S2016 as described above, and then finishes execution of the present routine.

With the throttle mechanism fail-safe control process thus executed by the ECU 25, the engine 1 is able to continue operating even in the case where a failure occurs in the throttle mechanism, and the vehicle in which the engine 1 is installed is able to run in a limp-home mode. Furthermore, the ECU 25 is able to suppress or minimize deterioration in the driveability and the quality of exhaust emissions of the engine 1 during limp-home running of the vehicle.

Returning to the fail-safe control routine of FIG. 19, when it is determined in step S1902 that at least one of the timing changing mechanism 19, the phase difference sensor 20, the working angle changing mechanism 21 and the working angle sensor 22 is at fault, the ECU 25 determines that the variable intake-valve mechanism is at fault, and proceeds to step S1904.

In step S1904, the ECU 25 displays information indicating occurrence of failures on the display device 28, and stops control of the throttle actuator 16, the timing changing mechanism 19, the working angle changing mechanism 21, the spark plug 5 and the fuel injectors 6, thereby to stop the operation of the engine 1.

If the drive system of the throttle mechanism operates normally and the opening angle of the throttle valve 15 can be fixed to a predetermined angle, or the throttle valve 15 held at a position other than the fully closed position fails to operate normally, the ECU 25 may stop control of the timing changing mechanism 19 and the working angle changing mechanism 21, and then execute control for retarding the ignition timing and/or control for operating the engine 1 with the reduced number of cylinders, thereby to continue the operation of engine 1 while adjusting the torque of the engine 1. In this case, the vehicle in which the engine 1 is installed is able to run in a limp-home mode.

After finishing the process of the above-described step S1904, the ECU 25 once finishes execution of the present routine.

If it is determined in step S1901 that the output signal value of the throttle position sensor 17 is within the normal output range, and the output signal value of the throttle position sensor 17 changes in accordance with the control signal value transmitted from the ECU 25 to the throttle actuator 16, the ECU 25 determines that the throttle mechanism operates normally, and proceeds to step S1905.

In step S1905, the ECU 25 determines whether a failure occurs in the variable intake-valve mechanism, namely, whether a failure or failures occur(s) in at least one of the timing changing mechanism 19, the phase difference sensor 20, the working angle changing mechanism 21 and the working angle sensor 22.

More specifically, the ECU 25 determines whether the output signal value of the phase difference sensor 20 changes in accordance with the control signal value transmitted from the ECU 25 to the timing changing mechanism 19, whether the output signal value of the phase difference sensor 20 is within the normal output range, whether the output signal value of the working angle sensor 22 changes in accordance with the control signal value transmitted from the ECU 25 to the working angle changing mechanism 21, and whether the output signal value of the working angle sensor 22 is within the normal output range.

If it is determined in step S1905 that the output signal value of the phase difference sensor 20 does not change in accordance with the control signal value transmitted from the ECU 25 to the timing changing mechanism 19, or the output signal value of the phase difference sensor 20 is not within the normal output range, or the output signal value of the working angle sensor 22 does not change in accordance with the control signal value transmitted from the ECU 25 to the working angle changing mechanism 21, or the output signal value of the working angle sensor 22 is not within the normal output range, the ECU 25 determines that a failure or failures occur(s) in the variable intake-valve mechanism, and proceeds to step S1906.

Figure 21:
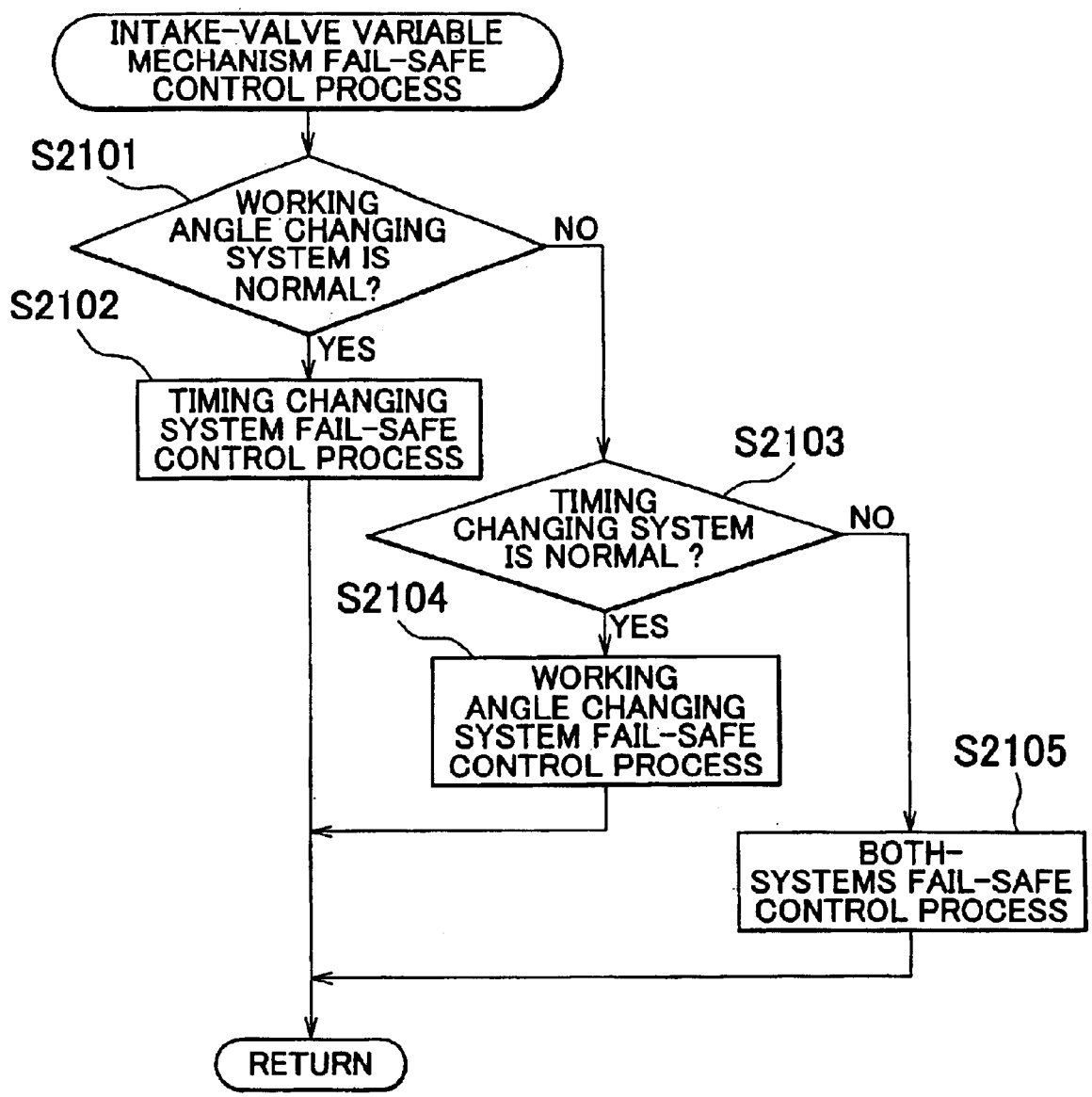
FIG. 21 is a flowchart showing a variable intake-valve mechanism fail-safe control routine.

In step S1906, the ECU 25 displays information indicating occurrence of the failure(s) on the display device 28, and executes a variable intake-valve mechanism fail-safe control process. In the variable intake-valve mechanism fail-safe control routine, the ECU 25 executes a variable intake-valve mechanism fail-safe control routine as shown in FIG. 21. This variable intake-valve mechanism fail-safe control routine is stored in advance in the ROM of the ECU 25, and is executed by the ECU 25 when the throttle mechanism operates normally and the variable intake-valve mechanism is at fault.

In the variable intake-valve mechanism fail-safe control routine, the ECU 25 initially determines in step S2101 whether the working angle changing system operates normally. More specifically, the ECU 25 determines whether the output signal value of the working angle sensor 22 changes in accordance with the control signal value transmitted from the ECU 25 to the working angle changing mechanism 21, and whether the output signal value of the working angle sensor 22 is within the normal output range.

If it is determined in step S2101 that the output signal value of the working angle sensor 22 changes in accordance with the control signal value transmitted from the ECU 25 to the working angle changing mechanism 21, and the output signal value of the working angle sensor 22 is within the normal output range, the ECU 25 determines that the working angle changing system operates normally and the timing changing system is at fault, and proceeds to step S2102.

In step S2102, the ECU 25 executes a timing changing system fail-safe control process. In the timing changing system fail-safe process, the ECU 25 executes a timing changing system fail-safe control routine as shown in FIGS. 22A, 22B. This timing changing system fail-safe routine is stored in advance in the ROM of the ECU 25, and is executed by the ECU 25 when the throttle mechanism and the working angle changing system operate normally, and the timing changing system is at fault, i.e., the timing changing system fails to operate normally.

In the timing changing system fail-safe control routine, the ECU 25 initially determines in step S2201 whether the phase difference sensor 20 operates normally, namely, whether the output signal value of the phase difference sensor 20 is within the normal output range.

If step S2201 determines that the output signal value of the phase difference sensor 20 is within the normal output range, the ECU 25 determines that the timing changing mechanism 19 is at fault, and the phase difference sensor 20 operates normally, and proceeds to step S2202.

In step S2202, the ECU 25 stops control of the timing changing mechanism 19. In this case, the rotational phase of the intake camshaft relative to that of the crankshaft is fixed to the most retarded position.

In step S2203, the ECU 25 fixes the control value applied to the working angle changing mechanism 21 to the above-indicated first predetermined value. The first determined value is set to a value that makes the working angle of the intake value 3 equal to a certain angle that is between the maximum angle and the minimum angle and is closer to the minimum angle than to the maximum angle, as described above with reference to FIG. 5.

In step S2204, the ECU 25 reads the output signal value (i.e., the accelerator depression amount) of the accelerator position sensor 27. In step S2205, the ECU 25 calculates the throttle opening (target throttle opening) corresponding to the accelerator depression amount read in step S2204, according to the relationship between the accelerator depression amount and the throttle opening, as described above with reference to FIG. 6. In step S2206, the ECU 25 controls the throttle actuator 16 so that the opening angle of the throttle valve 15 becomes equal to the target throttle opening calculated in step S2205.

If it is determined in the above step S2201 that the output signal value of the phase difference sensor 20 is outside the normal output range, the ECU 25 determines that the timing changing mechanism 19 operates normally, and the phase difference sensor 20 is at fault, and proceeds to step S2207.

In step S2207, the ECU 25 fixes the control value applied to the timing changing mechanism 19 to a value (the most advanced value) that sets the rotational phase of the intake camshaft relative to that of the crankshaft at the most advanced position.

In step S2208, the ECU 25 calculates the engine speed based on time intervals at which the crank position sensor 23 generates a pulse signal. In step S2209, the ECU 25 reads the output signal value (accelerator depression amount) of the accelerator position sensor 27. In step S2210, the ECU 25 calculates the target intake air quantity of the engine 1, by using the engine speed calculated in step S2208 and the accelerator depression amount read in step S2209 as parameters.

In step S2211, the ECU 25 calculates the working angle (target working angle) of the intake valve 3 corresponding to the target intake air quantity calculated in step S2209, according to the relationship between the working angle of the intake valve 3 and the target intake air quantity as described above with reference to FIG. 10.

In step S2212, the ECU 25 controls the working angle changing mechanism 21 so that the actual working angle of the intake valve 3 becomes equal to the target working angle calculated in step S2211.

In step S2213, the ECU 25 reads the output signal value (accelerator depression amount) of the accelerator position sensor 27. In step S2214, the ECU 25 determines whether the accelerator depression amount read in step S2213 is equal to or larger than a predetermined value.

If it is determined in step S2214 that the accelerator depression amount is equal to or larger than the predetermined value, the ECU 25 proceeds to step S2215 to control the throttle actuator 16 so that the throttle valve 15 is fixed at a substantially fully open position. After finishing the process of step S2215, the ECU 25 once finishes execution of the present routine.

If it is determined in step S2214 that the accelerator depression amount is smaller than the predetermined value, on the other hand, the ECU 25 proceeds to step S2216 to calculate the throttle opening (target throttle opening) corresponding to the accelerator depression amount read in the above step S2213, according to the relationship between the accelerator depression amount and the throttle opening as described above with reference to FIG. 2.

In step S2217, the ECU 25 controls the throttle actuator 16 so that the actual opening angle of the throttle valve 15 becomes equal to the target throttle opening calculated in step S2216. Then, the ECU 25 once finishes execution of the present routine.

With the timing changing system fail-safe control routine of FIGS. 22A, 22B thus executed by the ECU 25, the engine 1 is able to continue operating, and the vehicle in which the engine 1 is installed is able to run in a limp-home mode, even in the case where a failure occurs in the timing changing system. Furthermore, the ECU 25 is able to suppress or minimize deterioration in the driveability and the quality of exhaust emissions of the engine 1 during limp-home running of the vehicle.

Returning to the variable intake-valve mechanism fail-safe control routine of FIG. 21, when it is determined in step S2101 that the output signal value of the working angle sensor 22 does not change in accordance with the control signal value transmitted from the ECU 25 to the working angle changing mechanism 21, or the output signal value of the working angle sensor 22 is outside the normal output range, the ECU 25 determines that the working angle changing system is at fault, and proceeds to step S2103.

In step S2103, it is determined whether the timing changing system operates normally. More specifically, the ECU 25 determines whether the output signal value of the phase difference sensor 20 changes in accordance with the control signal value transmitted from the ECU 25 to the timing changing mechanism 19, and whether the output signal value of the phase difference sensor 20 is within the normal output range.

If it is determined in step S2103 that the output signal value of the phase difference sensor 20 changes in accordance with the control signal value transmitted from the ECU 25 to the timing changing mechanism 19, and that the output signal value of the phase difference sensor 20 is within the normal output range, the ECU 25 determines that the timing changing system operates normally and the working angle changing system is at fault, namely, the working angle changing system fails to operate normally, and proceeds to step S2104.

Figure 23:
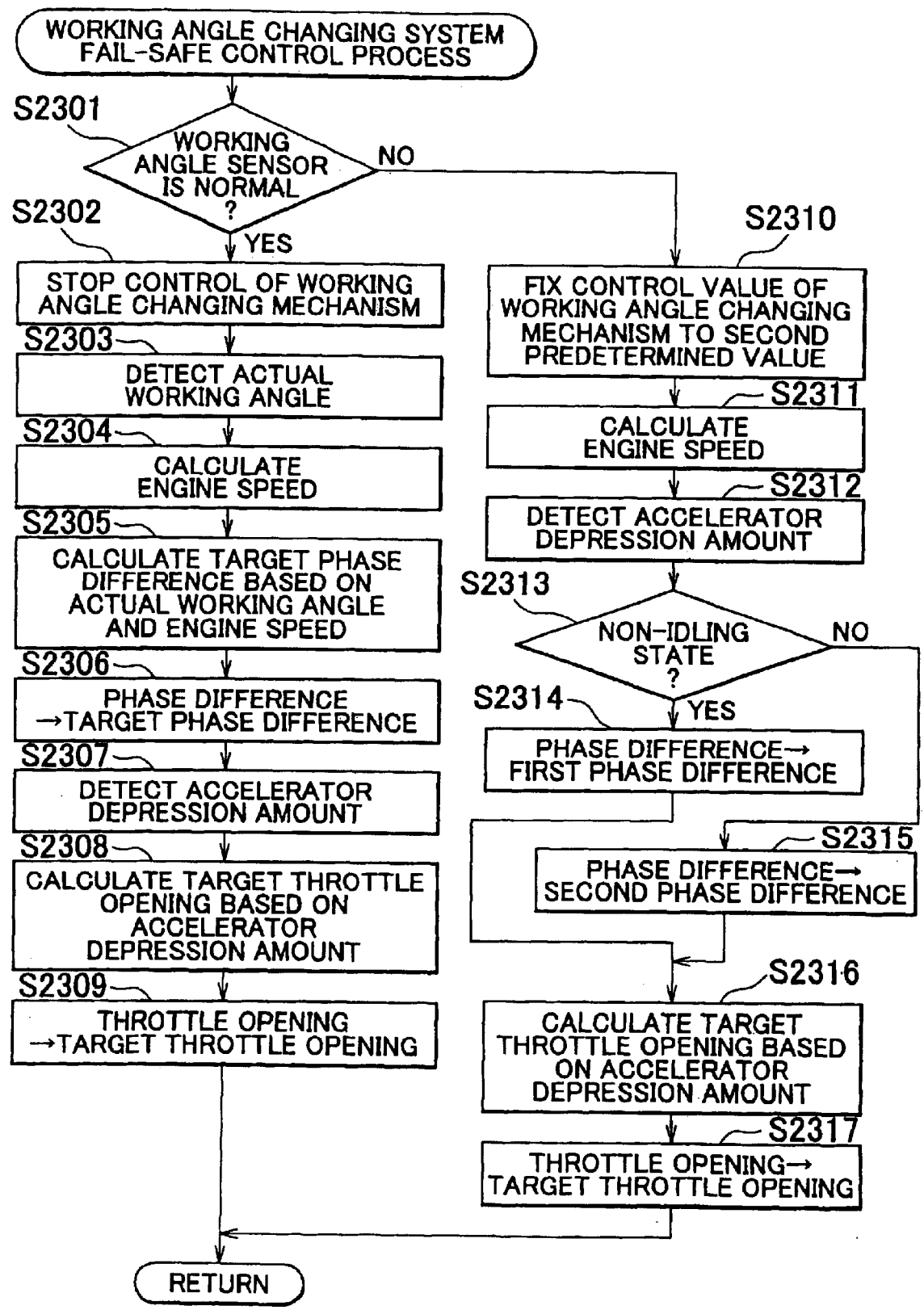
FIG. 23 is a flowchart showing a working angle changing system fail-safe control routine.

In step S2104, the ECU 25 executes a working angle changing system fail-safe control process. In the working angle changing system fail-safe control process, the ECU 25 executes a working angle changing system fail-safe control routine as shown in FIG. 23. This working angle changing system fail-safe control routine is stored in advance in the ROM of the ECU 25, and is executed by the ECU 25 when the throttle mechanism and the timing changing system operate normally, and the working angle changing system is at fault.

In the working angle changing system fail-safe control routine, the ECU 25 initially determines in step S2301 whether the working angle sensor 22 operates normally. More specifically, the ECU 25 determines whether the output signal value of the working angle sensor 22 is within the normal output range.

If it is determined in step S2301 that the output signal value of the working angle sensor 22 is within the normal output range, the ECU 25 determines that the working angle sensor 22 operates normally, and the working angle changing mechanism 21 is at fault, and proceeds to step S2302. In step S2302, the ECU 25 stops control of the working angle changing mechanism 21.

In step S2303, the ECU 25 reads the output signal value (indicative of the actual working angle of the intake valve 3) of the working angle sensor 22. In step S2304, the ECU 25 calculates the engine speed of the engine 1, based on time intervals at which the crank position sensor 23 generates a pulse signal.

In step S2305, the ECU 25 calculates the target phase difference corresponding to the actual working angle of the intake valve 3 read in step S2303 and the engine speed calculated in step S2304, according to the relationship among the rotational phase of the intake camshaft relative to that of the crankshaft, the engine speed and the working angle, as described above with reference to FIG. 11.

In step S2306, the ECU 25 controls the timing changing mechanism 19 so that the rotational phase difference between the intake camshaft and the crankshaft coincides with the target phase difference calculated in step S2305.

In step S2307, the ECU 25 reads the output signal value (indicative of the accelerator depression amount) of the accelerator position sensor 27. In step S2308, the ECU 25 calculates the throttle opening (target throttle opening) corresponding to the accelerator depression amount read in step S2307, according to the relationship between the accelerator depression amount and the throttle opening as described above with reference to FIG. 6.

In step S2309, the ECU 25 controls the throttle actuator 16 so that the actual opening angle of the throttle valve 15 becomes equal to the target throttle opening calculated in step S2308. After executing step S2309, the ECU 25 once finishes execution of the present routine.

If it is determined in step S2301 that the output signal value of the working angle sensor 22 is outside the normal output range, the ECU 25 determines that the working angle sensor 22 is at fault and the working angle changing mechanism 21 operates normally, and proceeds to step S2310.

In step S2310, the ECU 25 fixes the control value applied to the working angle changing mechanism 21 to the above-indicated second predetermined value. The second predetermined value is set to a value that makes the working angle of the intake valve closer to the minimum angle than to the maximum angle, as described above.

In step S2311, the ECU 25 calculates the engine speed based on time intervals at which the crank position sensor 23 generates a pulse signal. In step S2312, the ECU 25 reads the output signal value (indicative of the accelerator depression amount) of the accelerator position sensor 27. In step S2313, the ECU 25 determines whether the engine 1 is in a non-idling state, based on the engine speed calculated in step S2311 and the accelerator depression amount read in step S2312.

More specifically, the ECU 25 determines that the engine 1 is in an idling state when the engine speed is equal to or lower than a predetermined speed (e.g., about 900 rpm), and the accelerator pedal 26 is not depressed at all (i.e., the accelerator depression amount is equal to zero). The ECU 25 determines that the engine 1 is in a non-idling state when the engine speed is higher than the predetermined speed, and the accelerator depression amount is not equal to zero.

If it is determined in step S2313 that the engine 1 is in a non-idling state, the ECU 25 proceeds to step S2314 to control the timing changing mechanism 19 so that the difference of the rotational phase of the intake camshaft from that of the crankshaft becomes equal to a first phase difference. The first phase difference is set to a phase difference that provides the opening and closing timing of the intake valve 3 as described above with reference to FIG. 12.

Figure 13:
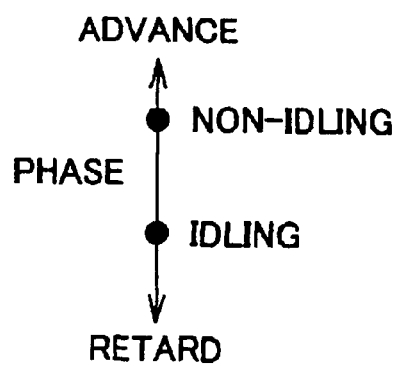
FIG. 13 is a view indicating the rotational phase of the intake camshaft relative to that of the crankshaft in the case where a failure occurs in the working angle sensor.

If it is determined in step S2313 that the engine 1 is in an idling state, the ECU 25 proceeds to step S2315, and controls the timing changing mechanism 19 so that the difference of the rotational phase of the intake camshaft from that of the crankshaft becomes equal to a second phase difference. The second phase difference is set to a phase difference which provides the opening/closing timing of the intake valve 3 that is retarded relative to the opening/closing timing determined by the first phase difference, as described above with reference to FIG. 13.

After executing step S2314 or step S2315, the ECU 25 proceeds to step S2316 to calculate the throttle opening (target throttle opening) corresponding to the accelerator depression amount read in step S2312, according to the relationship between the throttle opening and the accelerator depression amount as described above with reference to FIG. 6.

In step S2317, the ECU 25 controls the throttle actuator 16 so as to control the opening angle of the throttle valve 15 to the target throttle opening calculated in step S2316. Then, the ECU 25 once finishes execution of the present routine.

With the working angle changing system fail-safe control routine of FIG. 23 thus executed by the ECU 25, the engine 1 is able to continue operating, and the vehicle in which the engine 1 is installed is able to run in a limp-home mode, even in the case where a failure occurs in the working angle changing system. Furthermore, the ECU 25 is able to suppress or minimize deterioration in the driveability and the quality of exhaust emissions of the engine 1 during a limp-home running of the vehicle.

Returning to the variable intake-valve mechanism fail-safe control routine of FIG. 21, if it is determined in step S2103 that the output signal value of the phase difference sensor 20 does not change in accordance with the control signal value transmitted from the ECU 25 to the timing changing mechanism 19, or that the output signal value of the phase difference sensor 20 is outside the normal output range, the ECU 25 determines that both the timing changing system and the working angle changing system are at fault, and proceeds to step S2105.

Figure 24:
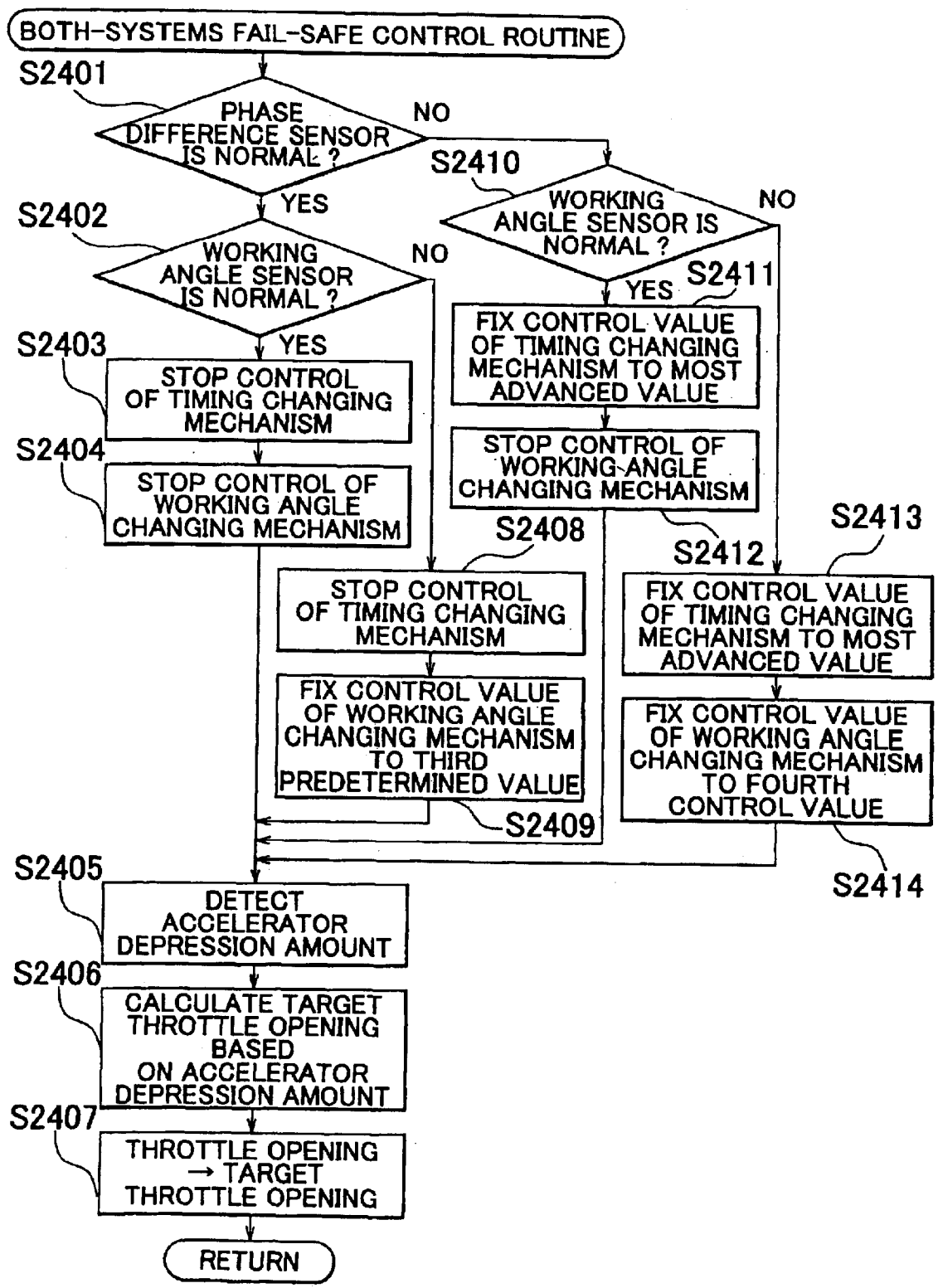
FIG. 24 is a flowchart showing a both-systems fail-safe control routine.

In step S2105, the ECU 25 executes a both-systems fail-safe control process. In the both-systems fail-safe control process, the ECU 25 executes a both-systems fail-safe control routine as shown in FIG. 24. This both-systems fail-safe routine is stored in advance in the ROM of the ECU 25, and is executed by the ECU 25 when the throttle mechanism operates normally, and both the timing changing system and the working angle changing system are at fault.

In the both-systems fail-safe control routine, the ECU 25 initially determines in step S2401 whether the phase difference sensor 20 operates normally, namely, whether the output signal value of the phase difference sensor 20 is within the normal output range. If it is determined in step S2401 that the output signal value of the phase difference sensor 20 is within the normal output range, the ECU 25 determines that the phase difference sensor 20 operates normally, and the timing changing mechanism 19 is at fault, and proceeds to step S2402.

In step S2402, the ECU 25 determines whether the working angle sensor 22 operates normally, namely, whether the output signal value of the working angle sensor 22 is within the normal output range. If it is determined in step S2402 that the output signal value of the working angle sensor 22 is within the normal output range, the ECU 25 determines that the working angle sensor 22 operates normally, and the working angle changing mechanism 21 is at fault. In this case, the ECU 25 executes a fail-safe control process of steps S2403 through S2407 for the case where failures occur in the timing changing mechanism 19 and the working angle changing mechanism 21.

In step S2403, the ECU 25 stops control of the timing changing mechanism 19. In step S2404, the ECU 25 stops control of the working angle changing mechanism 21.

In step S2405, the ECU 25 reads the output signal value (indicative of the accelerator depression amount) of the accelerator position sensor 27. In step S2406, the ECU 25 calculates the throttle opening (the target throttle opening) corresponding to the accelerator depression amount read in step S2405, according to the relationship between the accelerator depression amount and the throttle opening as described above with reference to FIG. 6.

In step S2407, the ECU 25 controls the throttle actuator 16 so that the actual opening angle of the throttle valve 15 becomes equal to the target throttle opening calculated in step S2406. Then, the ECU 25 once finishes execution of the present routine.

If it is determined in step S2402 that the output signal value of the working angle sensor 22 is outside the normal output range, the ECU 25 determines that the working angle sensor 22 is at fault and the working angle changing mechanism 21 operates normally. In this case, the ECU 25 executes a fail-safe control process of steps S2408, S2409 and S2405–S2407 for the case where failures occur in the timing changing mechanism 19 and the working angle sensor 22.

In step S2408, the ECU 25 stops control of the timing changing mechanism 19. In step S2409, the ECU 25 fixes the control value applied to the working angle changing mechanism 21 to the above-indicated third predetermined value. The third predetermined value is set to a value that makes the working angle of the intake valve 3 substantially equal to the predetermined angle as described above with reference to FIG. 5.

After executing step S2409, the ECU 25 performs the above-described operations of steps S2405–S2407, and then finishes execution of the present routine.

If it is determined in the above step S2401 that the output signal value of the phase difference sensor 20 is outside the normal output range, on the other hand, the ECU 25 determines that the phase difference sensor 20 is at fault and the timing changing mechanism 19 operates normally, and proceeds to step S2410.

In step S2410, the ECU 25 determines whether the output signal value of the working angle sensor 22 is within the normal output range. If it is determined in step S2410 that the output signal value of the working angle sensor 22 is within the normal output range, the ECU 25 determines that the working angle sensor 22 operates normally and the working angle changing mechanism 21 is at fault.

In this case, the ECU 25 executes a fail-safe control process of steps S2411, S2412 and S2405–S2407 for the case where failures occur in the phase difference sensor 20 and the working angle changing mechanism 21.

In step S2411, the ECU 25 fixes the control value applied to the timing changing mechanism 19 to the most advanced value. In step S2412, the ECU 25 stops control of the working angle changing mechanism 21. After executing step S2412, the ECU 25 perform the above-described operations of steps S2405–S2407, and then finishes execution of the present routine.

If it is determined in step S2410 that the output signal value of the working angle sensor 22 is outside the normal output range, the ECU 25 determines that the working angle sensor 22 is at fault and the working angle changing mechanism 21 operates normally. In this case, the ECU 25 executes a fail-safe control process of steps S2413, S2414 and S2405–S2407 for the case where failures occur in the phase difference sensor 20 and the working angle sensor 22.

Initially, in step S2413, the ECU 25 fixes the control value applied to the timing changing mechanism 19 to the most advanced value. In step S2414, the ECU 25 fixes the control value applied to the working angle changing mechanism 21 to a fourth control value. The fourth control value is set to a value that makes the opening timing of the intake valve 3 equal to the opening timing as described above with reference to FIG. 14. After executing step S2414, the ECU 25 performs the above-described operations of steps S2405–S2407, and finishes execution of the present routine.

With the both-systems fail-safe control routine of FIG. 24 thus executed by the ECU 25, the engine 1 is able to continue operating, and the vehicle in which the engine 1 is installed is able to run in a limp-home mode, even in the case where failures occur concurrently in the timing changing system and the working angle changing system. Furthermore, the ECU 25 is able to suppress or minimize deterioration in the driveability and the quality of exhaust emissions of the engine 1 during limp-home running of the vehicle.

Returning to the fail-safe control routine of FIG. 19, when it is determined in step S1905 that all of the timing changing mechanism 19, the phase difference sensor 20, the working angle changing mechanism 21 and the working angle sensor 22 operate normally, the ECU 25 determines that the throttle mechanism and the variable intake-valve mechanism operate normally, and proceeds to step S1907.

In step S1907, the ECU 25 controls the throttle mechanism and the variable intake-valve mechanism in normal manners, and once finishes execution of the present routine.

With the fail-safe control routine of FIG. 19 thus executed by the ECU 25, when a failure or failures occur(s) in at least one of the throttle mechanism, the timing changing system and the working angle changing system, an appropriate fail-safe control process selected depending upon the form of the failure is executed so that the engine 1 can continue operating while suppressing or minimizing deterioration in the driveability and the quality of exhaust emissions. Consequently, the vehicle in which the engine 1 is installed is able to run in a limp-home mode.

What is claimed is:

1. A control system of an internal combustion engine, comprising:

a timing changing unit that changes opening and closing timing of an intake valve relative to rotation of an output shaft of the engine;

a working angle changing unit that changes a working angle of the intake valve;

a throttle mechanism including a throttle valve provided in an intake passage of the engine and an actuator that is operable to open and close the throttle valve;

an intake air quantity control unit that controls the timing changing unit, the working angle changing unit and the throttle mechanism so as to control an intake air quantity of the engine to a target intake air quantity;

a failure detecting unit that detects a failure of at least one of the timing changing unit, the working angle changing unit and the throttle mechanism; and a fail-safe control unit capable of executing different fail-safe control processes corresponding to different forms of failures that can be detected by the failure detecting unit, wherein when the failure detecting unit actually detects a failure, the fail-safe control unit executes a selected one of the different fail-safe control processes depending upon the form of the failure detected by the failure detecting unit.

2. The control system according to claim 1, wherein when the failure detecting unit detects a failure of the working angle changing unit, the fail-safe control unit controls the working angle changing unit so that the working angle of the intake valve becomes substantially equal to a predetermined angle, and controls the timing changing unit so that the opening and closing timing of the intake valve substantially coincides with opening and closing timing corresponding to the predetermined angle, while controlling the throttle mechanism so as to change an opening angle of the throttle valve according to the target intake air quantity.

3. The control system according to claim 1, wherein:

the working angle changing unit comprises a first drive unit that is operable to change the working angle of the intake valve, and a working angle sensing unit that detects the working angle of the intake valve; and when the failure detecting unit detects a failure of the first drive unit, the fail-safe control unit stops control of the first drive unit, and controls the timing changing unit based on the working angle detected by the working angle sensing unit, while controlling the throttle mechanism so as to change an opening angle of the throttle valve according to the target intake air quantity.

4. The control system according to claim 1, wherein:

the working angle changing unit comprises a first drive unit that is operable to change the working angle of the intake valve, and a working angle sensing unit that detects the working angle of the intake valve; and when the failure detecting unit detects a failure of the working angle sensing unit, the fail-safe control unit fixes a control value applied to the first drive unit to a predetermined value, and controls the timing changing unit so as to fix the opening and closing timing of the intake valve to predetermined timing, while controlling the throttle mechanism so as to change an opening angle of the throttle valve according to the target intake air quantity.

5. The control system according to claim 4, wherein the fail-safe control unit retards the opening and closing timing of the intake valve to be established when the engine is in an idling state, with respect to the opening and closing timing of the intake valve to be established when the engine is in a non-idling state.

6. The control system according to claim 2, wherein:

the working angle changing unit comprises a first drive unit that is operable to change the working angle of the intake valve, and a working angle sensing unit that detects the working angle of the intake valve; and when the failure detecting unit detects a failure of the first drive unit, the fail-safe control unit stops control of the first drive unit, and controls the timing changing unit based on the working angle detected by the working angle sensing unit, while controlling the throttle mechanism so as to change an opening angle of the throttle valve according to the target intake air quantity.

7. The control system according to claim 2, wherein:

the working angle changing unit comprises a first drive unit that is operable to change the working angle of the intake valve, and a working angle sensing unit that detects the working angle of the intake valve; and when the failure detecting unit detects a failure of the working angle sensing unit; the fail-safe control unit fixes a control value applied to the first drive unit to a predetermined value, and controls the timing changing unit so as to fix the opening and closing timing of the intake valve to predetermined timing, while controlling the throttle mechanism so as to change the opening angle of the throttle valve according to the target intake air quantity.

8. The control system according to claim 7, wherein the fail-safe control unit retards the opening and closing timing of the intake valve to be established when the engine is in an idling state, with respect to the opening and closing timing of the intake valve to be established when the engine is in a non-idling state.

9. The control system according to claim 1, wherein when the failure detecting unit detects a failure of the timing changing unit, the fail-safe control unit controls the timing changing unit so that the opening and closing timing of the intake valve substantially coincides with predetermined opening and closing timing, and controls the working angle changing unit and the throttle mechanism so that the intake air quantity of the engine becomes substantially equal to the target intake air quantity.

10. The control system according to claim 1, wherein:

the timing changing unit comprises a second drive unit that is operable to change the opening and closing timing of the intake valve, and a timing sensing unit that detects the opening and closing timing of the intake valve; and when the failure detecting unit detects a failure of the second drive unit, the fail-safe control unit stops control of the second drive unit, and controls the working angle changing unit so as to fix the working angle of the intake valve to a predetermined angle, while controlling the throttle mechanism so as to change an opening angle of the throttle valve according to the target intake air quantity.

11. The control system according to claim 1, wherein:

the timing changing unit comprises a second drive unit that is operable to change the opening and closing timing of the intake valve, and a timing sensing unit that detects the opening and closing timing of the intake valve; and when the failure detecting unit detects a failure of the timing sensing unit, the fail-safe control unit fixes a control value applied to the second drive unit to a predetermined value, and controls the working angle changing unit so as to change the working angle of the intake valve according to the target intake air quantity.

12. The control system according to claim 11, wherein the predetermined value to which the control value applied to the second drive unit is fixed is determined so that the opening timing of the intake valve is advanced relative to rotation of the output shaft of the engine.

13. The control system according to claim 9, wherein:

the timing changing unit comprises a second drive unit that is operable to change the opening and closing timing of the intake valve, and a timing sensing unit that detects the opening and closing timing of the intake valve; and when the failure detecting unit detects a failure of the second drive unit, the fail-safe control unit stops control of the second drive unit, and controls the working angle changing unit so as to fix the working angle of the intake valve to a predetermined angle, while controlling the throttle mechanism so as to change an opening angle of the throttle valve according to the target intake air quantity.

14. The control system according to claim 9, wherein:

the timing changing unit comprises a second drive unit that is operable to change the opening and closing timing of the intake valve, and a timing sensing unit that detects the opening and closing timing of the intake valve; and when the failure detecting unit detects a failure of the timing sensing unit, the fail-safe control unit fixes a control value applied to the second drive unit to a predetermined value, and controls the working angle changing unit so as to change the working angle of the intake valve according to the target intake air quantity.

15. The control system according to claim 14, wherein the predetermined value to which the control value applied to the second drive unit is fixed is determined so that the opening timing of the intake valve is advanced relative to rotation of the output shaft of the engine.

16. The control system according to claim 1, wherein when the failure detecting unit detects failures of the working angle changing unit and the timing changing unit, the fail-safe control unit controls the working angle changing unit so that the working angle of the intake valve becomes substantially equal to a predetermined angle, and controls the timing changing unit so that the opening and closing timing of the intake valve substantially coincides with predetermined opening and closing timing, while controlling the throttle mechanism so as to change an opening angle of the throttle valve according to the target intake air quantity.

17. The control system according to claim 1, wherein:

the working angle changing unit comprises a first drive unit that is operable to change the working angle of the intake valve, and a working angle sensing unit that detects the working angle of the intake valve;

the timing changing unit comprises a second drive unit that is operable to change the opening and closing timing of the intake valve, and a timing sensing unit that detects the opening and closing timing of the intake valve; and when the failure detecting unit detects failures of the first drive unit and the timing sensing unit, the fail-safe control unit stops control of the first drive unit, and fixes a control value applied to the second drive unit to a predetermined value, while controlling the throttle mechanism so as to change an opening angle of the throttle valve according to the target intake air quantity.

18. The control system according to claim 1, wherein:

the working angle changing unit comprises a first drive unit that is operable to change the working angle of the intake valve, and a working angle sensing unit that detects the working angle of the intake valve;

the timing changing unit comprises a second drive unit that is operable to change the opening and closing timing of the intake valve, and a timing sensing unit that detects the opening and closing timing of the intake valve; and when the failure detecting unit detects failures of the working angle sensing unit and the second drive unit, the fail-safe control unit fixes a control value applied to the first drive unit to a predetermined value, and stops control of the second drive unit, while controlling the throttle mechanism so as to change an opening angle of the throttle valve according to the target intake air quantity.

19. The control system according to claim 1, wherein:

the working angle changing unit comprises a first drive unit that is operable to change the working angle of the intake valve, and a working angle sensing unit that detects the working angle of the intake valve;

the timing changing unit comprises a second drive unit that is operable to change the opening and closing timing of the intake valve, and a timing sensing unit that detects the opening and closing timing of the intake valve; and when the failure detecting unit detects failures of the working angle sensing unit and the timing sensing unit, the fail-safe control unit fixes a control value applied to the first drive unit to a first predetermined value, and fixes a control value applied to the second drive unit to a second predetermined value, while controlling the throttle mechanism so as to change an opening angle of the throttle valve according to the target intake air quantity.

20. The control system according to claim 1, wherein:

the working angle changing unit comprises a first drive unit that is operable to change the working angle of the intake valve, and a working angle sensing unit that detects the working angle of the intake valve;

the timing changing unit comprises a second drive unit that is operable to change the opening and closing timing of the intake valve, and a timing sensing unit that detects the opening and closing timing of the intake valve; and when the failure detecting unit detects failures of the first drive unit and the second drive unit, the fail-safe control unit stops control of the first drive unit and the second drive unit, and controls the throttle mechanism so as to change an opening angle of the throttle valve according to the target intake air quantity.

21. The control system according to claim 16, wherein:

the working angle changing unit comprises a first drive unit that is operable to change the working angle of the intake valve, and a working angle sensing unit that detects the working angle of the intake valve;

the timing changing unit comprises a second drive unit that is operable to change the opening and closing timing of the intake valve, and a timing sensing unit that detects the opening and closing timing of the intake valve; and when the failure detecting unit detects failures of the first drive unit and the timing sensing unit, the fail-safe control unit stops control of the first drive unit, and fixes a control value applied to the second drive unit to a predetermined value, while controlling the throttle mechanism so as to change the opening angle of the throttle valve according to the target intake air quantity.

22. The control system according to claim 16, wherein:

the working angle changing unit comprises a first drive unit that is operable to change the working angle of the intake valve, and a working angle sensing unit that detects the working angle of the intake valve;

the timing changing unit comprises a second drive unit that is operable to change the opening and closing timing of the intake valve, and a timing sensing unit that detects the opening and closing timing of the intake valve; and when the failure detecting unit detects failures of the working angle sensing unit and the second drive unit, the fail-safe control unit fixes a control value applied to the first drive unit to a predetermined value, and stops control of the second drive unit, while controlling the throttle mechanism so as to change the opening angle of the throttle value according to the target intake air quantity.

23. The control system according to claim 16, wherein:

the working angle changing unit comprises a first drive unit that is operable to change the working angle of the intake valve, and a working angle sensing unit that detects the working angle of the intake valve;

the timing changing unit comprises a second drive unit that is operable to change the opening and closing timing of the intake valve, and a timing sensing unit that detects the opening and closing timing of the intake valve; and when the failure detecting unit detects failures of the working angle sensing unit and the timing sensing unit, the fail-safe control unit fixes a control value applied to the first drive unit to a first predetermined value, and fixes a control value applied to the second drive unit to a second predetermined value, while controlling the throttle mechanism so as to change the opening angle of the throttle valve according to the target intake air quantity.

24. The control system according to claim 16, wherein:

the working angle changing unit comprises a first drive unit that is operable to change the working angle of the intake valve, and a working angle sensing unit that detects the working angle of the intake valve;

the timing changing unit comprises a second drive unit that is operable to change the opening and closing timing of the intake valve, and a timing sensing unit that detects the opening and closing timing of the intake valve; and when the failure detecting unit detects failures of the first drive unit and the second drive unit, the fail-safe control unit stops control of the first drive unit and the second drive unit, and controls the throttle mechanism so as to change the opening angle of the throttle valve according to the target intake air quantity.

25. The control system according to claim 1, wherein when the failure detecting unit detects a failure of the throttle mechanism, the fail-safe control unit controls the throttle mechanism so as to fix an opening angle of the throttle valve to a predetermined degree, and controls the working angle changing unit and the timing changing unit according to the target intake air quantity, while executing at least one of ignition retard control for retarding ignition timing and reduced-cylinder operation control for operating the engine with a reduced number of cylinders if an actual intake air quantity is larger than the target intake air quantity.

* * * * *